United States Patent [19]
Sawada

[11] Patent No.: US 6,234,588 B1
[45] Date of Patent: May 22, 2001

[54] BRAKE SYSTEM FOR VEHICLES

[75] Inventor: Mamoru Sawada, Yokkaichi (JP)

[73] Assignee: Denso Corporation, Kariya (JP)

[*] Notice: Subject to any disclaimer, the term of this patent is extended or adjusted under 35 U.S.C. 154(b) by 0 days.

[21] Appl. No.: 09/253,725

[22] Filed: Feb. 22, 1999

[30] Foreign Application Priority Data

Feb. 20, 1998 (JP) ................................. 10-038679

[51] Int. Cl.$^7$ ....................................................... B60T 8/36
[52] U.S. Cl. .................................. 303/119.1; 303/113.1; 303/116.2; 303/3; 303/15
[58] Field of Search ........................... 303/116.1, 116.2, 303/113.1, 119.1, 10, 3, 20

[56] References Cited

U.S. PATENT DOCUMENTS

| | | | |
|---|---|---|---|
| 4,844,558 | * 7/1989 | Ishii et al. | 303/119.1 |
| 5,209,552 | * 5/1993 | Reinartz et al. | 303/116.2 |
| 5,282,676 | * 2/1994 | Takeda et al. | 303/113.2 |
| 5,383,718 | * 1/1995 | Burgdorf et al. | 303/113.2 |
| 5,393,132 | 2/1995 | Yogo et al. | |
| 5,641,209 | * 6/1997 | Kushi et al. | 303/20 |
| 5,797,620 | 8/1998 | Eyrainer. | |
| 5,882,089 | * 3/1999 | Nakamura et al. | 303/10 |
| 5,890,776 | * 4/1999 | Sawada | 303/116.1 |
| 5,931,545 | * 8/1999 | Yonemura et al. | 303/113.4 |

FOREIGN PATENT DOCUMENTS

| | | |
|---|---|---|
| 62-13804 | 1/1987 | (JP). |
| 7-117644 | 5/1995 | (JP). |
| 9-169259 | 6/1997 | (JP). |

* cited by examiner

Primary Examiner—Robert J. Oberleitner
Assistant Examiner—Devon Kramer
(74) Attorney, Agent, or Firm—Pillsbury Winthrop LLP

(57) ABSTRACT

In a brake by wire system, a linear differential pressure control valve is provided to control accurately wheel cylinder pressure. A brake fluid conduit extending from a reservoir is branched out into two conduits, each of which is transmitted to each of right and left wheel cylinders. A linear differential pressure control valve is disposed in the conduit and an another linear differential pressure control valve in each of the branched out conduits. Brake fluid sucked from the reservoir by a motor pump is discharged to each of the branched out conduits between the valve and the wheel cylinder. The two valves thus connected in series are operative step by step to control the wheel cylinder pressure in accordance with the current commanded in response to brake pedal depression. The former linear differential pressure control valve is energized at first at a normal braking operation and, therefor, the identical pressure is applied to both of the wheel cylinders so that the detected wheel cylinder pressure may be adjusted. Further, a hybrid system using the brake by wire and a conventional master cylinder is also provided.

39 Claims, 11 Drawing Sheets

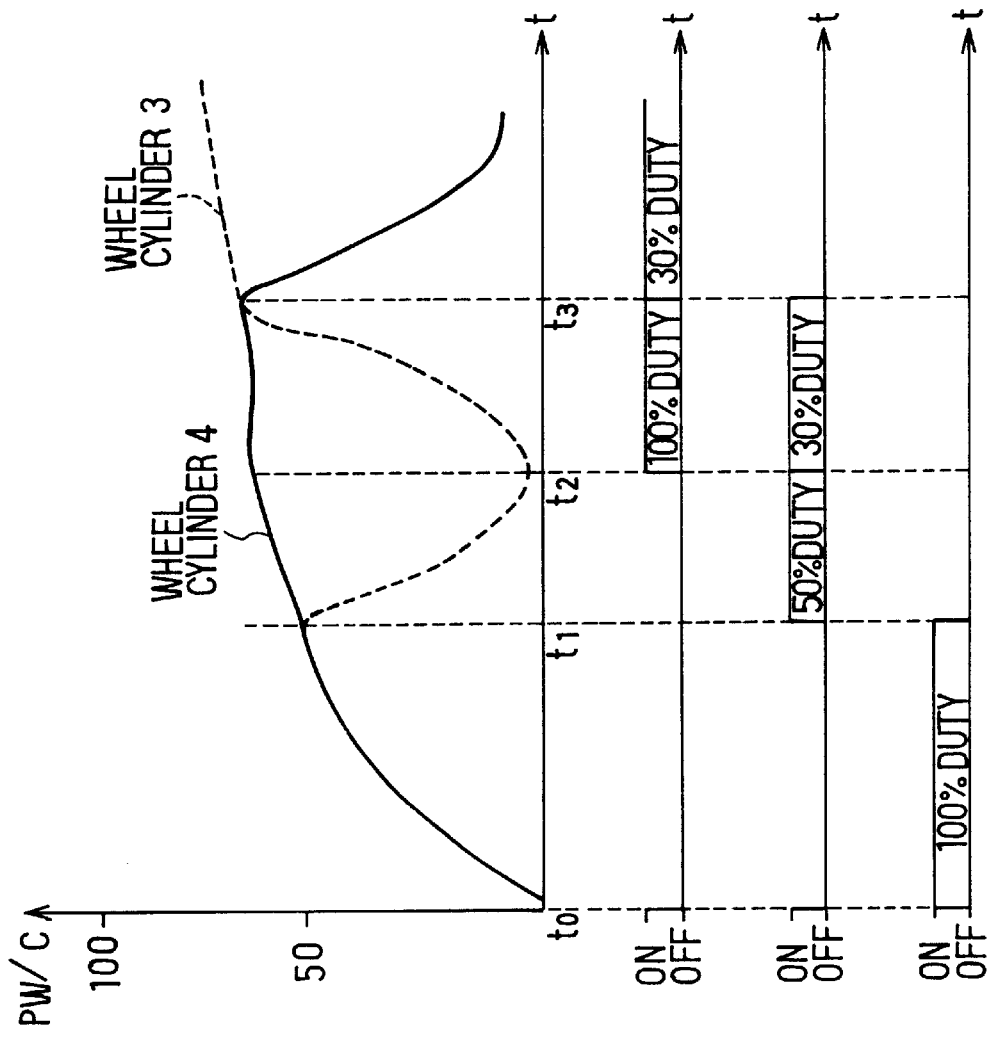

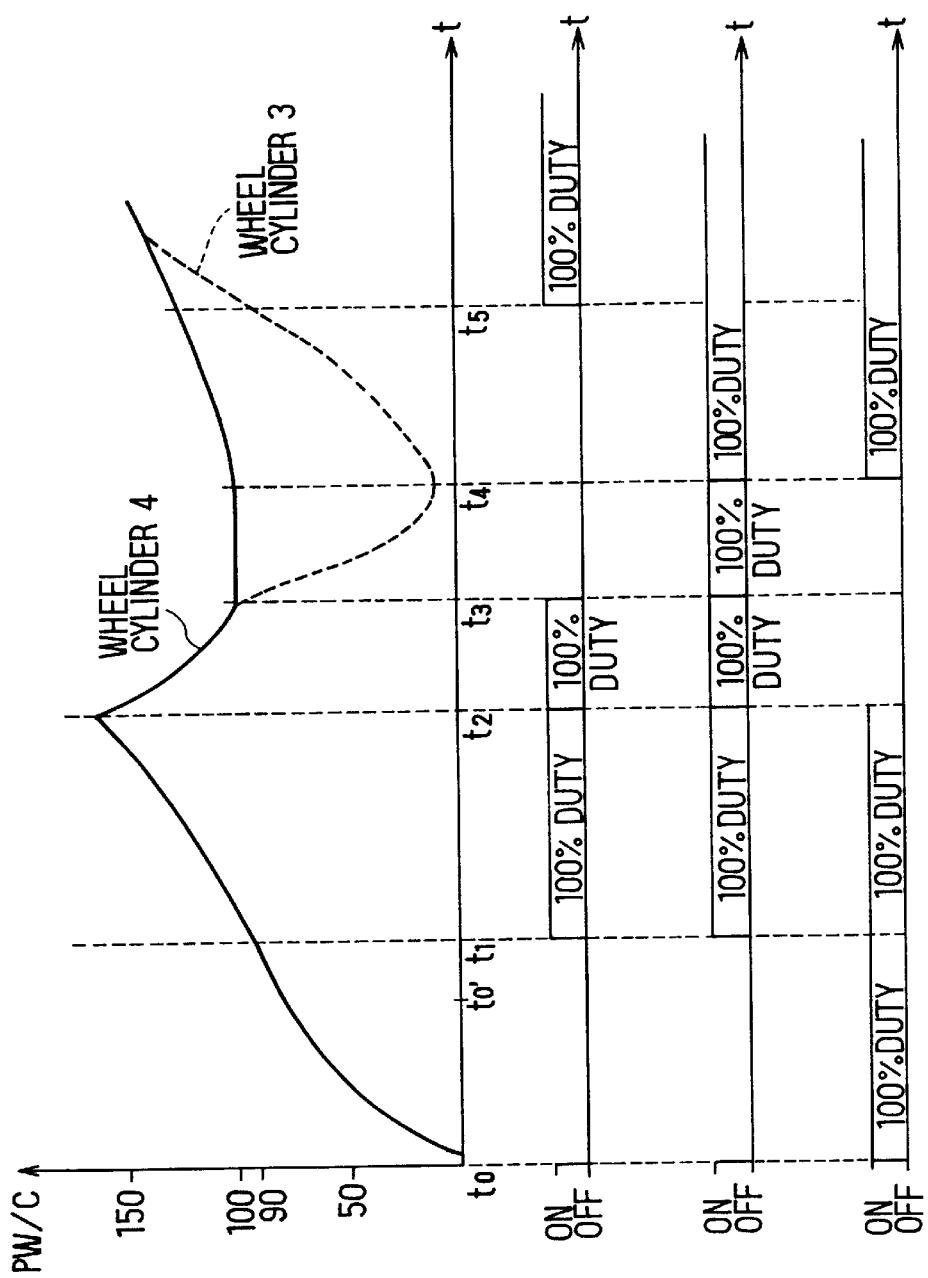

BRAKE SYSTEM FOR VEHICLES

CROSS REFERENCE TO THE RELATED APPLICATION

The present application is based upon and claims the benefit of priority of the prior Japanese patent application No. Hei 10-38679 filed on Feb. 20, 1998, the content of which is incorporated by reference.

BACKGROUND OF THE INVENTION

1. Field of the Invention

The present invention relates to a brake system so called "brake by wire system" in which the state of a braking operation by a driver is converted to an electric signal for inducing a wheel braking force.

2. Description of Related Art

The brake by wire system is well known. In this system, an electric signal representing the state of brake pedal operation by a driver, i.e., the amount of brake pedal stroke or brake pedal depression pressure, is generated. A wheel braking force can be induced based on the electric signal. The conventional brake by wire system employs, as examples for inducing a wheel braking force, a method of directly pressing a brake pad against a brake disk separately in each wheel by using ultrasonic motors or a method of producing a wheel cylinder pressure by using a two-position valve and a pump, as disclosed in Japanese patent Laid-open publication No. Hei 9-188242, under the title of "brake fluid pressure control apparatus".

SUMMARY OF THE INVENTION

It is an object of the present invention, in a hydraulic type brake system for generating wheel cylinder pressure by using brake fluid, to provide a brake by wire type system that is simple in its construction but has a better characteristic and features on the control for producing braking force. To achieve this object, a linear differential pressure control valve and a pump are provided for generating and controlling a wheel cylinder pressure. Thus, a completely or partly shut-off control and a flow through control for the brake fluid in the hydraulic conduit in accordance with a commanded current can be flexibly and accurately accomplished. As a result, an adequate control responsive to the braking requirement by a driver can be easily realized.

It is an another object of the invention to provide a brake by wire type system in which the detected brake fluid pressure difference between a pair of the left and right wheel cylinders for a vehicle can be easily compensated by means of mechanical or electronic adjustment. To achieve this object, in addition to first and second linear differential pressure control valves respectively disposed in each of the two conduits branched out from the brake fluid conduit communicating to a reservoir, a third linear differential pressure control valve is provided at the brake fluid conduit between the reservoir and the branched out portion of the conduit. While the first and second linear differential pressure control valves control each pressure of the left and right wheel cylinder, independently, the third linear differential pressure control valve controls commonly both pressures of the left and right wheel cylinders. To prevent from imposing unnecessary yawing moment to a vehicle, it is inevitable to keep the braking force difference between the left and right wheels at a normal braking operation at the minimum. The third linear differential pressure control valve serves to keep the difference between a pair of wheel cylinder pressures to a level less than the predetermined amount to be required for the prevention of the unnecessary yawing moment of the vehicle.

It is a further object of the invention to provide a fail safe hybrid construction incorporating not only a brake by wire function but also a mechanical brake function directly responsive to the brake pedal operation by a driver. According to the above described invention, even if a malfunction takes place in the brake by wire function, the mechanical brake function for the front wheels or the front and rear wheels will serve. Furthermore, to facilitate the hybrid function, a servo function directly responsive to driver's brake pedal depression is provided under the help of the pump driven by a signal separately generated at the time of the brake pedal depression, even if an electronically control unit for the brake by wire function does not work. For this purpose, the brake system of this invention has a brake fluid conduit extending from a portion between a two-position valve and the third linear differential pressure control valve to a servo room of a master cylinder.

BRIEF DESCRIPTION OF THE DRAWINGS

These and other objects, features and characteristics of the present invention will be appreciated from a study of the following detailed description, the appended claims, and drawings, all of which form a part of this application. In the drawings:

FIG. 5A is a timing chart showing a transition of wheel cylinder pressures at a normal brake operation and an anti-skid control in the second embodiment;

FIG. 5B is a timing chart showing a commanded current to a first linear differential pressure control valve;

FIG. 5C is a timing chart showing a commanded current to a second linear differential pressure control valve;

FIG. 5D is a timing chart showing a commanded current to a third linear differential pressure control valve;

FIG. 6A is a timing chart showing a transition of wheel cylinder pressures at an urgent brake operation and an anti-skid control in the second embodiment;

FIG. 6B is a timing chart showing a commanded current to a first linear differential pressure control valve;

FIG. 6C is a timing chart showing a commanded current to a second linear differential pressure control valve;

FIG. 6D is a timing chart showing a commanded current to a third linear differential pressure control valve;

DETAILED DESCRIPTION OF PREFERRED EMBODIMENTS

The preferred embodiments of the present invention will be described hereinafter with reference to the accompanying drawings.

(First Embodiment)

Figure 1A:
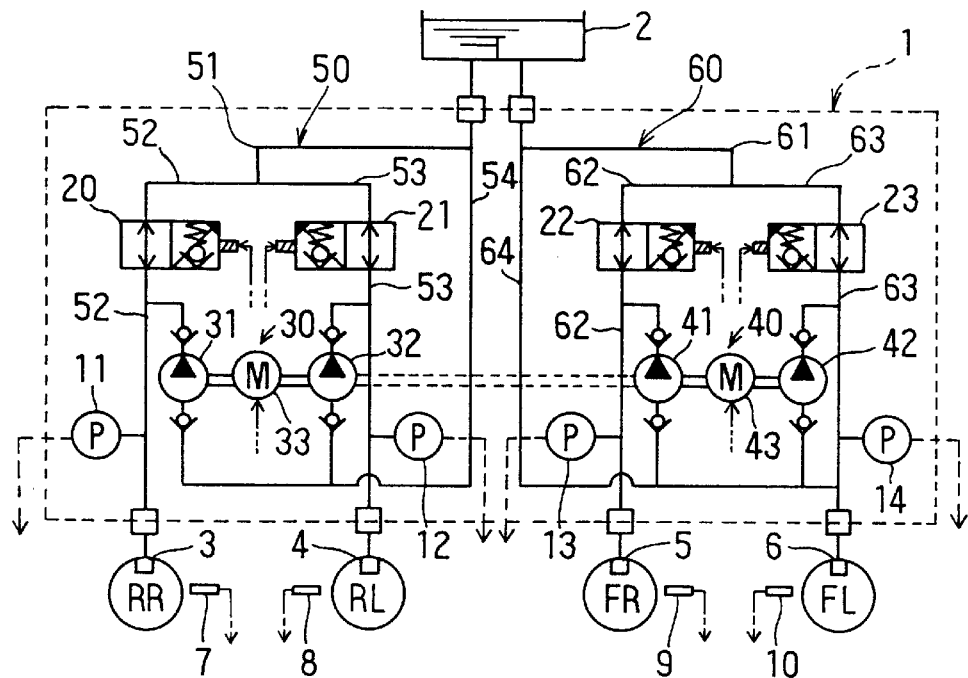
FIG. 1A is a schematic diagram of a brake system according to a first embodiment of the present invention.
Figure 1B:
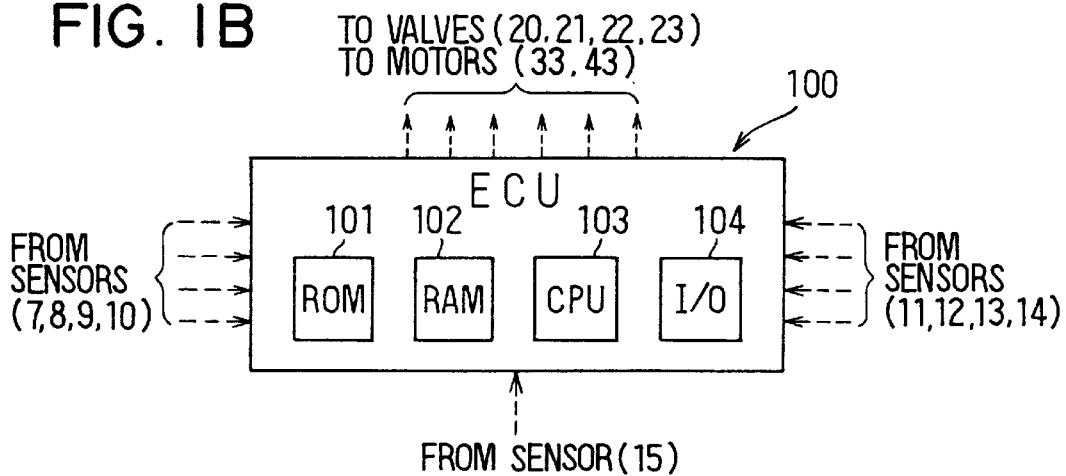
FIG. 1B is a schematic diagram of an electronic control unit in the first embodiment.
Figure 1C:
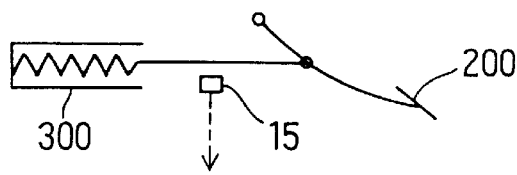
FIG. 1C is a schematic diagram of a brake pedal in the first embodiment.

FIGS. 1A, 1B and 1C are a schematic diagram of a brake system for rear-drive four wheel vehicles, a schematic diagram of an electronic control unit and a schematic diagram of a brake pedal, respectively, according to a first embodiment of the present invention. Each of Figs. hereinafter shows the valve member position of respective valves in the case that a brake pedal is not depressed. The brake fluid stored in a reservoir 2 under atmospheric pressure is transmitted hermetically to each of wheel cylinders 3, 4, 5 and 6 through a hydraulic unit 1. Wheel speed sensors 7, 8, 9 and 10 are equipped respectively in a rear right wheel RR, a rear left wheel RL, a front right wheel FR, and a front left wheel FL for detecting the velocity of each wheel.

The hydraulic unit 1 is provided with a first brake conduit line 50 for the rear right wheel RR and the rear left wheel RL and a second brake conduit line 60 for the front right wheel FR and the front left wheel FL. As the structure of the second brake conduit line 60 is the same as that of the first brake conduit line 50, only the structure of the first brake conduit line 50 will be described in detail hereinafter.

The first brake conduit line 50 is provided with a conduit 51 extending from the reservoir 2 and a conduit 52 extending to a wheel cylinder 3 for the rear right wheel RR and a conduit 53 to a wheel cylinder 4 for the rear left wheel RL which are constituted by branching out from the conduit 51. Linear differential pressure control valves 20 and 21 having a flow-through position and a differential pressure producing position are disposed in the conduits 52 and 53, respectively. The linear differential pressure control valves 20 and 21 at the flow-through position allow the brake fluid to flow between the reservoir 2 and the respective wheel cylinders 3 and 4 almost without flow restriction. The flow-through position turns to the differential pressure producing position when energized to the linear differential pressure control valves 20 and 21. The lift length of the valve member (a length between the valve member and a valve seat when the valve member is away from the valve seat) can be linearly varied in accordance with the current value applied to a solenoid coil of the linear differential pressure control valve. At the differential pressure producing position, each of the conduits 52 and 53 can be controlled to completely shut off or partly shut off the brake fluid flow according to the lift length of the valve member. For example, assuming that the lift length of the valve member from the valve seat is at an intermediate position, the respective brake fluid flow from the brake cylinders 3 and 4 to the reservoir 2 through the respective conduits 52 and 53 is partly restricted according to the lift length thereof so that the brake fluid pressure at the side of the wheel cylinders 3 and 4 (wheel cylinder pressure) may be maintained to a certain pressure higher than that at the side of the reservoir 2. Each of linear differential pressure control valves 20, 21, 22 and 23 as disclosed in the first embodiment of the present invention is constructed to allow the maximum 200 kgf /cm$^2$ pressure (which corresponds to the maximum holding pressure of the wheel cylinder). The maximum holding pressure can be determined by a value of the spring coefficiency of the spring biasing against the valve member of each linear differential pressure control valves 20, 21, 22 and 23. Higher is the co-efficiency of the spring, higher the maximum holding pressure is. 200 kgf/cm$^2$ is the maximum pressure normally required for each wheel cylinder of various kinds of vehicles.

A motor pump 30 comprises a motor 33 to be driven when energized and trochoid pumps 31 and 32 to be driven by the motor 33. Each of the trochoid pumps 31 and 32 which is provided to respond to each of the wheel cylinders 3 and 4 sucks the brake fluid from the reservoir 2 through a conduit 54 and discharges the same to respective conduits 52 and 53 between the wheel cylinders 3 and 4 and the linear differential pressure control valves 20 and 21. The trochoid pumps 31 and 32, a kind of gear pumps, have an advantage that a fluid discharge pulsation is smaller and a driving noise is lower, compared with those of a piston pump. Though the embodiments of the present invention show, as an example, the trochoid pump, the other type pumps such as piston pumps, outer-contact gear pumps and vane pumps can be used instead.

The construction of the second brake conduit line 60 is same as that of the first brake conduit line 50 and each component of the second brake conduit line 60 corresponds to that of the first brake conduit line 50 as shown below. Linear differential pressure control valves 22 and 23 correspond to the linear differential pressure control valves 20 and 21, respectively, a motor 43 and trochoid pumps 41 and 42 of a motor pump 40 to the motor 33 and the trochoid pumps 31 and 32 of the motor pump 30, respectively, and conduits 61, 62, 63 and 64 to the conduits 51, 52, 53 and 54, respectively.

Each of the linear differential pressure control valves 20, 21, 22 and 23 and the motors 33 and 43 is controlled or driven by control signals from an electronic control unit 100 (hereinafter referred to as ECU 100). When the ECU 100 does not generate the control signals, each valve element of the linear differential pressure control valves 20, 21, 22 and 23 is at the flow-through position as shown in FIG. 1. The ECU 100 is provided with a ROM 101, a RAM 102, a CPU 103 and an I/O interface which are well known.

The ECU 100 receives respective detected signals from the wheel speed sensors 7, 8, 9 and 10 that detect a wheel velocity of respective wheels, pressure sensors 11, 12, 13 and 14 that detect a pressure of respective wheel cylinders and a pedal stroke sensor 15 that detects a stroke length of a pedal 200 depressed by a driver. The stroke length of the pedal is a parameter showing a braking operation state of the vehicle required by the driver. A pedal depression pressure sensor that detects a pressure to the pedal by the driver can be used in place of the pedal stroke sensor. There is further provided with a bias mechanism 300 which reacts to give a bias against the stroke length or the depression pressure due to the pedal operation of the driver so that the driver may feel the reaction of the pedal depression operation.

Secondly, a brake control process to be executed in the brake system shown in FIG. 1A will be described briefly with reference to a flow chart of FIG. 2. The process shown in the flow chart is executed separately for respective wheels at a certain time interval, for example, at 6 ms.

Figure 3:
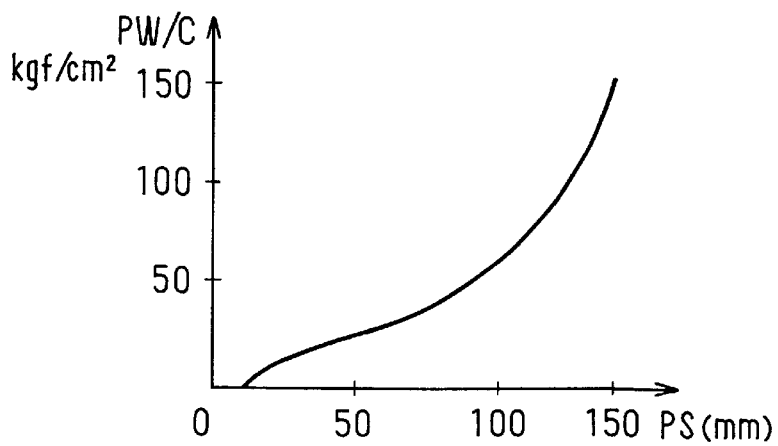
FIG. 3 is a chart indicating the model relationship between a wheel cylinder pressure and a pedal stroke length.

A step 105 is provided in order to check whether a brake switch, that is well known as a stop lamp switch and not disclosed in this drawing, is switched on. The brake switch is switched on at the time when the pedal 200 is substantially depressed by the driver and the vehicle is at the braking state thereby. If the answer is affirmative at the step 105, the process goes to a step 110 to drive the motors 33 and 43. At a step 120, the pedal stroke length PS is detected according to the detected signals from the pedal stroke sensor 15 and, at a step 130, each of the wheel cylinder pressures PW/C is detected by each of wheel cylinder pressure sensors 11, 12, 13 and 14 and, at a step 140, each wheel cylinder pressure to be applied to each of wheel cylinders 3, 4, 5 and 6 is determined based on the detected pedal stroke length PS and each of the detected wheel cylinder pressures PW/C. At a normal braking state, i.e., when a special braking control such as an anti-skid control is not performed, the aimed wheel cylinder pressures for the front and rear wheel cylinders are all same and can be determined in order to comply with, for an example, a well known model curb regarding the allocation of braking pressure, as described in a FIG. 3 which shows a wheel cylinder pressure in the horizontal line and a pedal stroke length in the vertical line. At a step 150, each of driving patterns for actuating respective linear differential pressure control valves 20, 21, 22 and 23 is set according to the wheel cylinder pressure determined at the step 140 and the wheel cylinder pressures PW/C detected at the step 130. Assuming that the pedal stroke length is 50 mm and the detected wheel cylinder pressure PW/C is 25 kgf/cm$^2$, the linear differential pressure control valve is driven by a duty control so as to open the valve member by 25% from the flow-through position (75% pressure difference producing position) so that the pressure between the pressure (atmospheric pressure) of the reservoir 2 and each of wheel cylinder pressures may be maintained at its given pressure difference. The current value to be commanded to respective differential pressure control valves is controlled by the duty rated current. If there exists a difference between the detected wheel cylinder pressure PW/C at the step 130 and the set wheel cylinder pressure at the step 140, the commanded current value to the linear differential pressure control valve is controlled to eliminate the pressure difference.

If, at the step 105, the answer becomes negative, a next step 160 is provided to switch off the motor and a subsequent step 170 to cut off the current supply to the linear differential pressure control valve to end up a whole control of the system.

The brake system described in the first embodiment of the present invention of FIG. 1A is provided with two independent brake fluid conduit lines and four linear differential pressure control valves and four pumps in order to realize the brake by wire system. This system employs the linear differential pressure control valve in which the lifting value of the valve member can be variably controlled by the commanded current value so that not only the smooth adjustment between the braking requirement parameter of the driver(such as the brake pedal depression pressure or the pedal stroke length) and the detected value from each wheel cylinder pressure sensors 11, 12, 13 and 14, but also smooth control for decreasing or increasing the wheel cylinder pressure may be achieved..

Each of the pumps 31, 32, 41 and 42 is respectively disposed for each of wheel cylinders 3, 4, 5 and 6. There are no common brake fluid conduits connecting the first and second brake fluid conduit lines and, even in each conduit line, no common conduit lines for increasing the pressure to be supplied to each of wheel cylinders, though there exists only a common conduit line to be used for releasing the pressure to be supplied to each wheel cylinder. Therefor, even if a malfunction such as a break down of the brake fluid conduit takes places in one of the independent brake fluid lines, the other brake fluid line can be effectively used to increase the wheel pressure. Furthermore, in case that one of the trochoid pumps in each brake conduit line happens to leak largely the brake fluid from its output side to its input side and is not effectively operated, the other trochoid pump is operative to discharge the brake fluid sufficiently enough to increase the cylinder pressure. This construction is very effective from a fail safe standpoint.

(Second Embodiment)

Figure 4A:
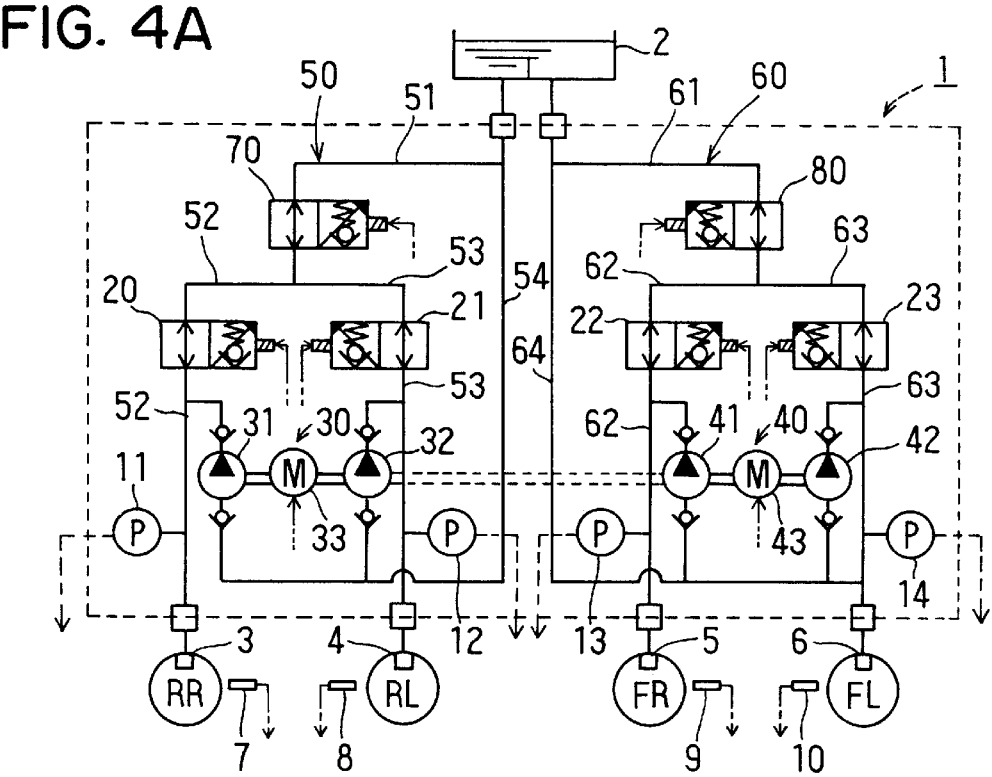
FIG. 4A is a schematic diagram of a brake system according to a second embodiment of the present invention.
Figure 4B:
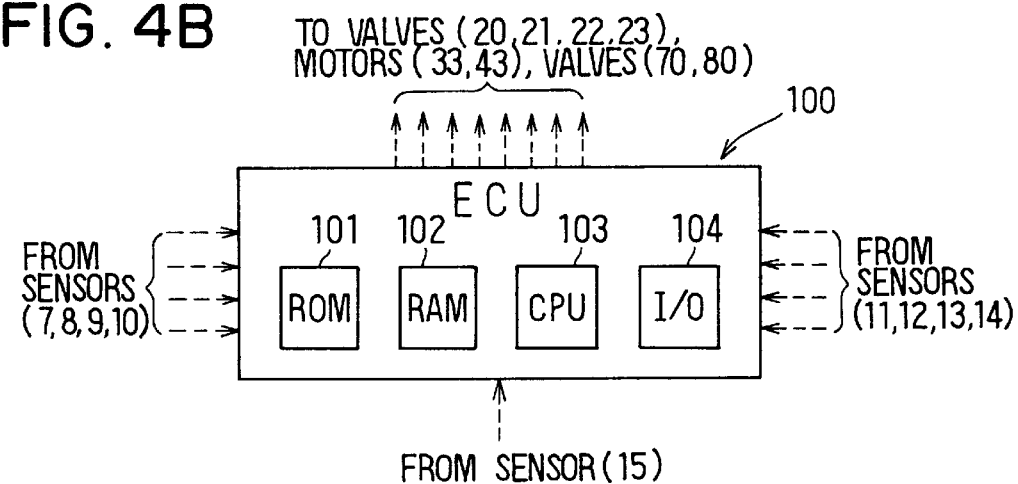
FIG. 4B is a schematic diagram of an electronic control unit in the second embodiment.
Figure 4C:
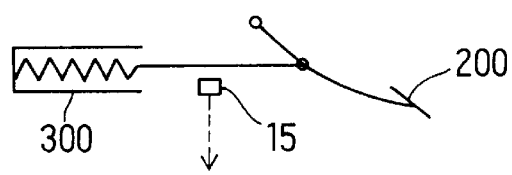
FIG. 4C is a schematic diagram of a brake pedal in the second embodiment.

FIGS. 4A, 4B and 4C show a construction of a brake system according to a second embodiment of the present invention. The construction having the same function and effect as those of the construction described in FIGS. 1A, 1B and 1C has the same reference number as that of FIGS. 1A, 1B and 1C. and its explanation will be omitted.

The brake system as described in FIG. 4A is provided with two linear differential pressure control valves 70 and 80, in addition to the brake system of FIG. 1A. Each of the linear differential pressure control valves 70 and 80 is disposed in each of the brake fluid conduits 51 and 52 extending from the reservoir 2 to the branched out portion. Assuming that the required maximum wheel cylinder pressure is 200 kgf/cm$^2$, the allowable maximum holding pressure of each of the linear differential pressure control valves 20, 21, 22 and 23 as well as the linear differential pressure control valves described at the second embodiment of the present invention can be set at a value of 100 kgf/cm$^2$.

The spring coefficiency of the bias spring of the linear differential pressure control valves of the second embodiment can be a half of that of the linear differential pressure control valves of the first embodiment shown in FIG. 1A. The current value for energizing the solenoid of the second embodiment can be also a half, compared with that of the first embodiment. Therefor, the solenoid having a relatively low heat resistance characteristic can be employed and the size of the linear differential pressure control valves becomes compact.

Each of the linear differential pressure control valves 70 and 80 is disposed in series with each of the linear differential pressure control valves 20 and 21 and each of the linear differential pressure control valves 22 and 23 in each of brake fluid conduit lines, respectively. Thus, the pressure of each wheel cylinder can be increased to 200 kgf/cm$^2$ by the series connection of each of the linear differential pressure control valves 70 and 80 and each of the linear differential pressure control valves 20, 21, 22 and 23. The series connection of the linear differential pressure control valves serves to suppress the current value to be applied to the linear differential pressure control valve and therefor, the heat resistance construction of the linear differential pressure control valve can be easily and compactly realized. This is an advantage, especially, in the brake by wire system, because it is necessary to supply the current to the linear differential pressure control valve during all the time when the driver keeps the depression operation of the pedal so that the relatively high heat resistance characteristic of the solenoid may be required.

The maximum 200 kgf/cm$^2$ differential pressure control by the system incorporating only one differential pressure control valve for a wheel cylinder as described in the FIG. 1 will result in a rough break down of control and thus, the control at the normal braking state covering 10 to 50 kgf/cm$^2$ which happens most frequently among the braking operations is relatively rough so that a control flexibility and a driver's pedal feeling may be adversely affected. To solve this drawback, it can be considered to adopt the linear differential pressure control valve having the allowable maximum holding pressure, 200 kgf/cm$^2$, but having a very fine break down control characteristic. However, this also has disadvantages that the cost of the valve will increase and the control becomes complicated.

The adoption of the linear differential pressure control valve having the maximum holding pressure 100 kgf/cm$^2$, as described in the second embodiment of the present invention, has a merit that the more fine break down control is available and the increased flexibility of control will improve the driver's braking feeling, in the case that a similar control as that of the linear differential pressure control valve having the maximum holding pressure 200 kgf/cm$^2$ is employed. Furthermore, the control by the linear differential pressure control valves in series connected for applying the pressure to the wheel cylinder has an another merit that the more and more fine break down control can be realized.

Figure 2:
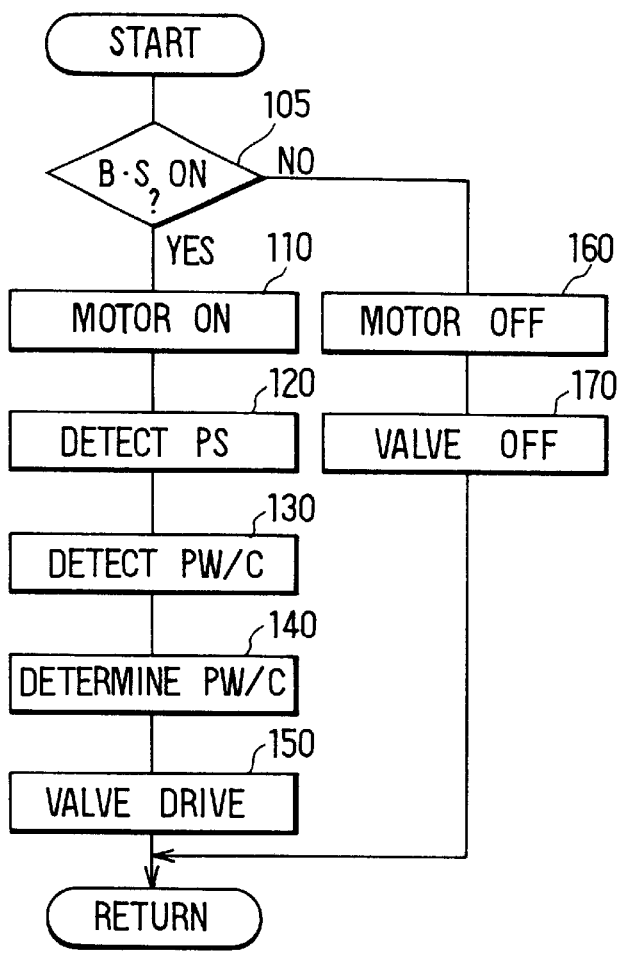
FIG. 2 is a process flow chart of the electronic control unit.

The brake system mentioned above is controlled basically according to a similar flow chart as described in the FIG. 2. However, if the control of the linear differential control valves 70 and 80 and the control of the linear differential pressure control valves 20, 21, 22 and 23 are carried out respectively in the following ways, there exists an advantage. At a normal braking state, i.e., the wheel cylinder pressure is less than 50 kgf/cm$^2$ at the state of no urgent braking or no anti-skid control due to the wheel slip, only the linear differential pressure control valves 70 and 80 are actuated to apply the pressure to each of the wheel cylinders and each of the linear differential pressure control valves 20, 21, 23 and 24 is kept at the flow-through position without the actuation thereto. The same value of the pressures will be applied to respective right and left wheel cylinders ( for example, the wheel cylinders 3 and 4) due to the mechanical construction, not due to the adjustment by a soft program which might be required in order to carry out the same pressure control for both of right and left wheel cylinders in the case of the brake system disclosed in the FIG. 1A. The same pressure compensation to the right and left wheel cylinders that is important to eliminate unnecessary yaw moment for the vehicle can be easily achieved.

When the pressure is applied to the right and left wheel cylinders separately for rear and front wheels by actuating the linear differential pressure control valves 70 and 80, the detected pressures of the pressure sensors 11 and 12 should be same and those of the pressure sensors 13 and 14 should be same. If different, there are fluctuations of characteristic between the pressure sensors 11 and 12 or between the pressure sensors 13 and 14. In this case, the fluctuation error of each pressure sensors 11, 12, 13 and 14 can be adjusted to be eliminated for the subsequent control.

When the pedal stroke length become larger to the extent of exceeding the normal braking region or when the pressure to be controlled by each of the linear differential pressure control valves 70 and 80 reaches near the allowable maximum holding pressure( for example, 100 kgf/cm$^2$ ), the linear differential pressure control valves 20, 21, 22 and 23 may be actuated, in addition to the linear differential pressure control valves 70 and 80, in order to increase the wheel cylinder pressure.

FIGS. 5A, 5B, 5C and 5D and FIGS. 6A, 6B, 6C and 6D describe timing charts for controlling the pressure to the wheel cylinders 3 and 4 in the first brake fluid conduit line at the second embodiment of the present invention. The FIG. 5A shows a transition of the pressure of each of the wheel cylinders 3 and 4 and FIGS. 5B, 5C and 5D a commanded current value to each of the linear differential pressure control valves 20, 21 and 70 at the normal braking operation and the anti-skid control when the wheel cylinder pressure is less than 70 kgf/cm$^2$.

At a time $t_0$, a driver begins to depress a brake pedal and the pump motor 30 starts driving and, till the time $t_1$, the linear differential pressure control valve 70 is energized at a 100% duty rate current so that the same pressure may be applied to respective wheel cylinders 3 and 4.

At a time $t_1$, if an excessive slip takes place only on a right wheel, the pressure of the wheel cylinder 3 decreases. At this time, the current supply to the linear differential pressure control valve 70 is cut off and, on the other hand, a current at 50% duty rate is supplied to the linear differential pressure control valve 21 corresponding to a rear left wheel which is not slipped excessively. The 50% duty rate current means the case that, for example, a pedal stroke sensor 15 detects that the driver recognizes the wheel slipping and releases a brake pedal depression. After the time $t_1$, a solid line shows the pressure of the wheel cylinder 4 and a dotted line the pressure of the wheel cylinder 3.

At a time $t_2$, if the slip of the right wheel is restrained, a control for increasing the pressure to the wheel cylinder 3 is carried out. For this purpose, the current is supplied at a 100% duty rate to the linear differential pressure control valve 20 in order to close substantially the valve member. At this time, the pressure of the wheel cylinder 3 increases rapidly to induce effectively a wheel braking force. If the driver dose not depress more the pedal and the pedal position is kept as it is during the time from $t_2$ to $t_3$, the linear differential pressure control valve 21 is controlled at a 30% duty rate current which is smaller than the current controlled during the time from $t_1$ to $t_2$ in order not to convert the level of pressure of the wheel cylinder 4.

After the time $t_3$, if an excessive slip on the left wheel takes place, the current supply to the linear differential pressure control valve 20 is cut off to decrease the pressure of the wheel cylinder 4 and the linear differential pressure control valve 20 is controlled at a 30% duty rate current to keep the pressure of the wheel cylinder substantially at the same level. As mentioned above, only the linear differential pressure control valve 70 is used for the brake fluid control before the time t, when the anti-skid control starts and, after the time $t_1$, the linear differential pressure control valves 20 and 21 are used without using the linear differential pressure control valve 70.

FIG. 6 is a timing chart showing a case at an urgent braking operation that a driver depresses the brake pedal strongly and rapidly and subsequently, an anti-skid control is carried out. During the time from $t_0$ to $t_1$, the contents of control are similar as described in the FIG. 5. When the ECU 100 determines, based on the detected signal from the pedal stroke sensor 15, at the time $t_0$' that the variation of a pedal stroke length per a unit time exceeds a predetermined amount and judges as an urgent braking, the current will be supplied to the linear differential pressure control valves 20 and 21, too, at the time t1. In this case, as the current supply to the linear differential pressure control valves 20 and 21 is carried out at the time when the wheel cylinder pressure is about 90 kgf/cm$^2$ which is below the maximum holding pressure (100 kgf/cm$^2$ ) of the linear differential pressure control valve 70, the pressure change of the wheel cylinder is very smooth. During the time from $t_1$ to $t_2$, all the linear differential pressure control valves are controlled at a 100% duty rate current to response to the urgent braking.

Assuming that a front right wheel slips excessively at the time $t_2$, the current supply to the linear differential pressure control valve 70 is cut off so that the pressure of the wheel cylinder may decrease till the maximum holding pressure of each linear differential pressure control valves 20 and 21. If the slip of the front right wheel can not be restrained even at the time $t_3$, the current supply to the linear differential pressure control valve 20 is cut off and the current supply to the linear differential pressure control valve 21 is kept at the 100% duty rate so that the pressure of the wheel cylinder 3 further decreases. After the time $t_3$, a solid line shows the pressure of the wheel cylinder 4 and a dotted line the pressure of the wheel cylinder 3.

At the time $t_4$, if the slip of the front right wheel has been restrained, the pressure increase to the wheel cylinder 3 commences by supplying a 100% duty rate current to the linear differential pressure control valve 70. Then, the pressure to the wheel cylinder 4 will increase to the value more than 100 kgf/cm$^2$ due to the pressure held by both of the linear differential pressure control valves 21 and 70.

When the pressure of the wheel cylinder 3 comes near the maximum holding pressure of the differential pressure control valve 70 (about 90 kgf/cm$^2$, same as the pressure at the time $t_1$) and unless the excessive slip on the front right wheel takes place, a 100% duty rate current is supplied to the linear differential pressure control valve 20, too. If it is detected that the vehicle came to stop or the depression of brake pedal by the driver was cancelled, the current supply to each of the linear differential pressure control valves 20, 21 and 70 and to the pump cease.

(Third Embodiment)

Figure 7A:
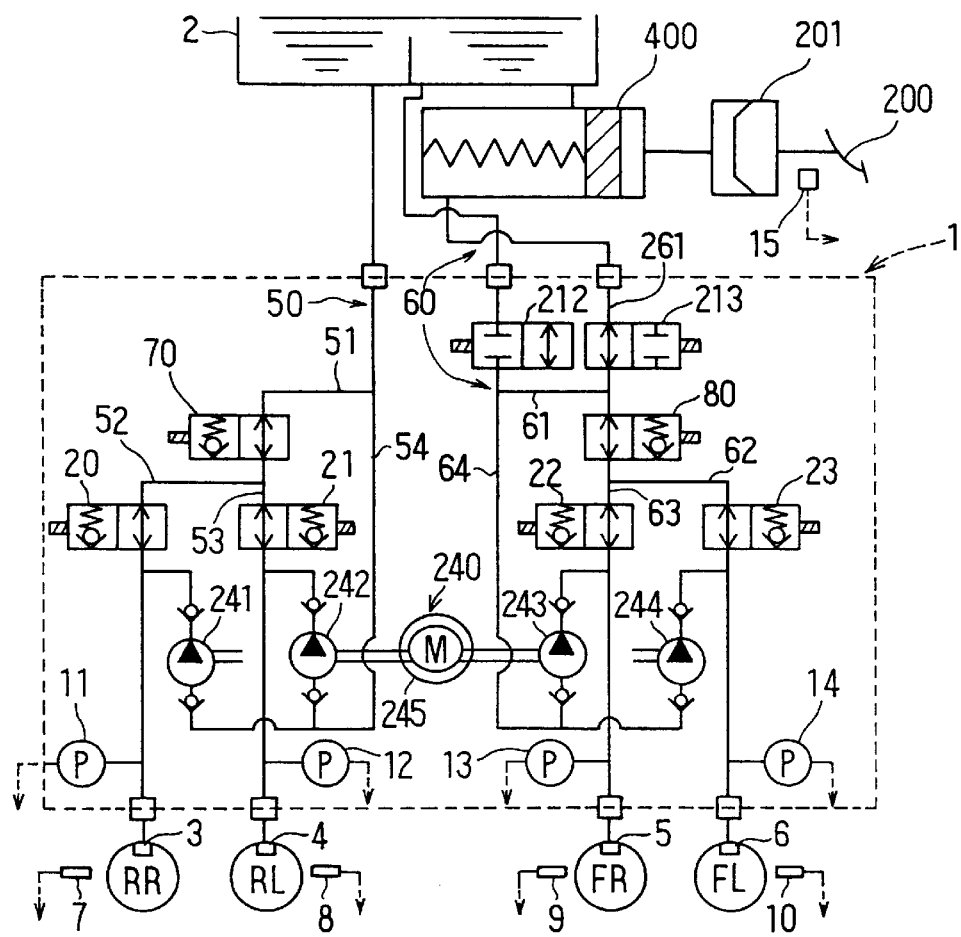
FIG. 7A is a schematic diagram of a brake system according to a third embodiment of the present invention.
Figure 7B:
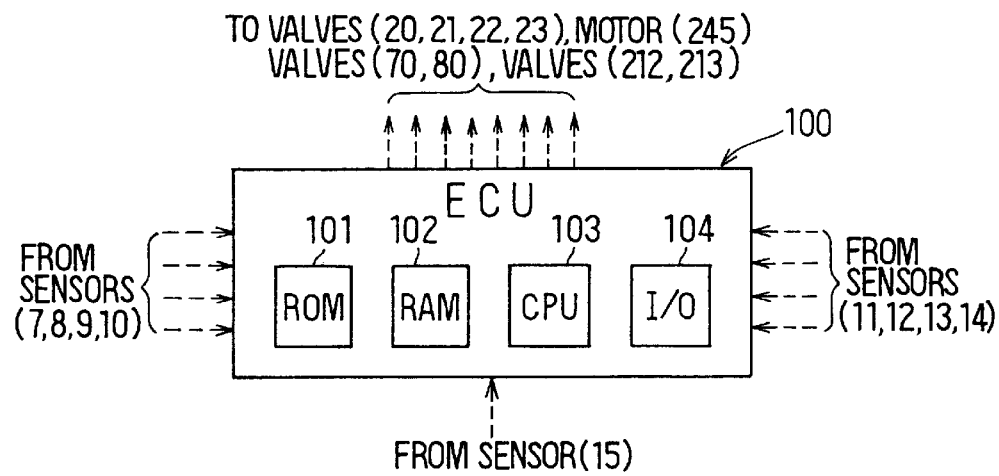
FIG. 7B is a schematic diagram of an electronic control unit in the third embodiment.

FIGS. 7A and 7B show a construction of a brake system according to a third embodiment of the present invention. The construction having the same function and effect as those of the construction described in FIGS. 1A and 1B and FIGS. 4A and 4B has the same reference number as that of FIGS. 1A, 1B, 4A and 4B and its explanation will be omitted. In the FIG. 7A, the first and second brake fluid conduit lines 50 and 60 are provided with the same construction as described in the FIG. 4A, except a motor pump 240 having a motor 245 for driving all of four trochoid pumps 241, 242, 243 and 244, instead of the motors 33 and 43 for respectively driving the pumps 31 and 32 and the pumps 41 and 42. At the side of the first brake fluid conduit line 50, only a brake by wire system is constituted, but at the side of the second brake fluid conduit line 60, not only the brake by wire system but also a conventional mechanical brake system are constituted as a hybrid system. The brake pedal 200 is connected with a brake booster 201 which boosts the pedal depression force in use of an engine intake manifold vacuum pressure. A rod extending from the brake booster 201 is connected to a single master cylinder 400 which produces a master cylinder pressure in accordance with the brake pedal depression by a driver. The axial length(longitudinal direction in the drawing) of the master cylinder 400 may be shorter than that of the conventional tandem master cylinder for vehicles. The size of the brake booster 201 may be more compact than the conventional one. A two-position valve 212, which is normally at a shut-off position, is disposed in a brake fluid conduit between the reservoir 2 and an intersection of the fluid conduit 61 extending to the linear differential pressure control valve 80 and the fluid conduit 64 transmitting to the suction side of the pumps 243 and 244. An another two-position valve 213, which is normally at a flow-through position, is disposed in the brake fluid conduit 261 extending from the master cylinder 400 to a portion of the fluid conduit 61 which is just before the linear differential pressure control valve 80. The master cylinder pressure produced by the master cylinder 400 is transmitted to the wheel cylinders 5 and 6 through the two-position valve 213, the linear differential pressure control valve 80 and the linear differential pressure control valves 22 and 23.

The hybrid brake system has a merit from a fail safe standpoint. Even if a malfunction takes place in the brake by wire system (failures of ECU or actuators) for the rear wheel, the pressure to the front right and left wheel cylinders 5 and 6 can be induced mechanically in responsive to the brake pedal depression. As an another merit, the driver can enjoy a natural brake pedal feeling because of the application of the master cylinder 400. Furthermore, at an urgent braking operation, a larger wheel cylinder pressure than the master cylinder pressure induced by the driver's brake pedal depression can be obtained by supplying the current to the linear differential pressure control valve 80 and driving the pumps 243 and 244, because the linear differential pressure control valve 80 is controlled to produce a pressure difference between the master cylinder pressure and the wheel cylinder pressure. If the two-position valve 213 is switched to the shut-off position and the two-position 212 to the flow-through position, the excessive pressure to the wheel cylinders 5 and 6 can be prevented by controlling the linear differential pressure control valves 80, 20 and 23 and driving the pumps 243 and 244, as described before.

(Fourth Embodiment)

Figure 8A:
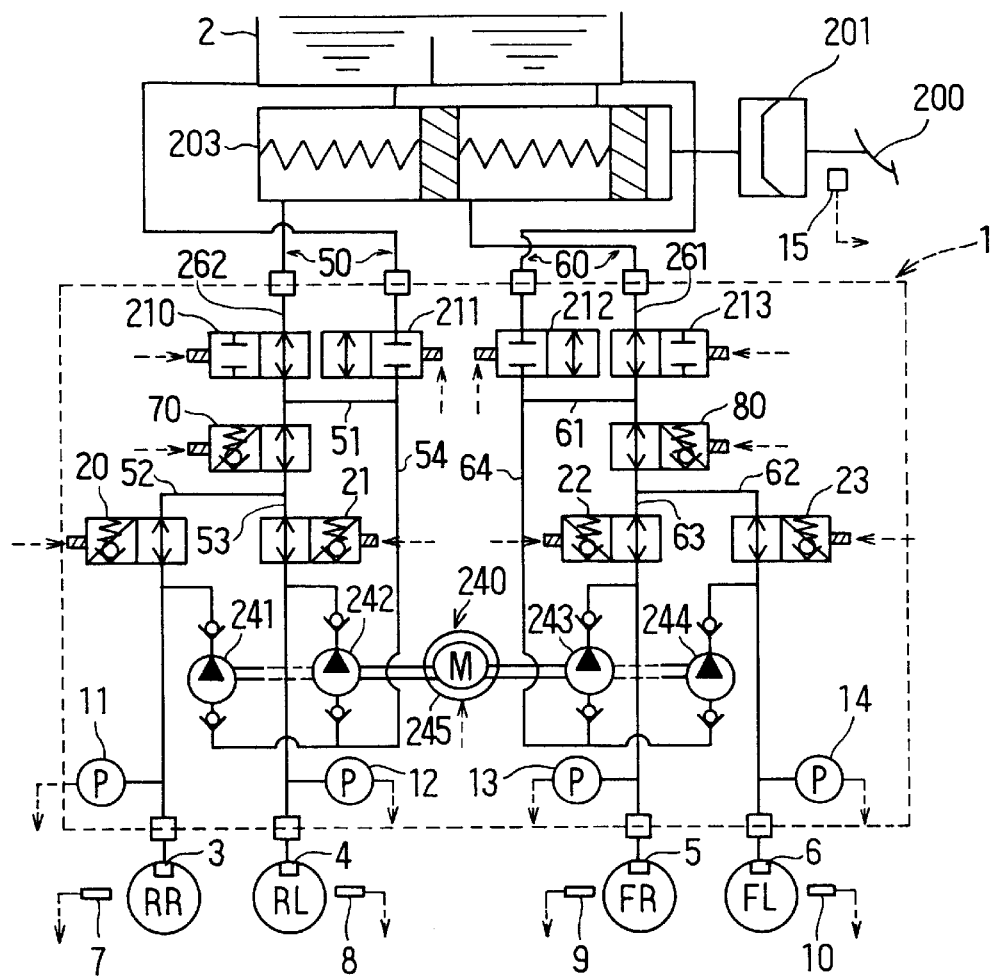
FIG. 8A is a schematic diagram of a brake system according to a fourth embodiment of the present invention.
Figure 8B:
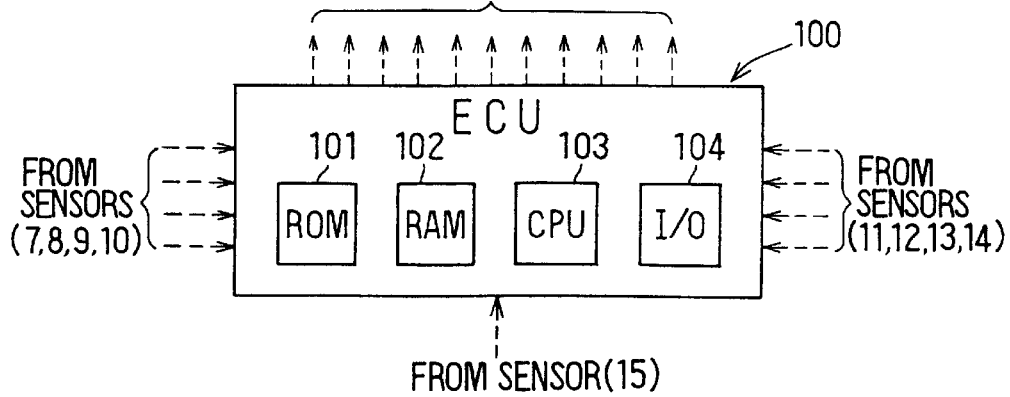
FIG. 8B is a schematic diagram of an electronic control unit in the fourth embodiment.

FIGS. 8A and 8B show a construction of a brake system according to a fourth embodiment of the present invention. The construction having the same function and effect as those of the construction described in FIGS. 7A and 7B has the same reference number as that of FIGS. 7A and 7B and its explanation will be omitted. In addition to the two-position valves 212 and 213, the linear differential pressure control valves 70, 80, 20, 21, 22 and 23, and the motor pump 240, as mentioned in the FIG. 7A, this system is provided with two-position valves 210 and 211 for rear wheels, too, which correspond to the two-position valves 212 and 213 for front wheels. The two-position valve 211, which is normally at a shut-off position, is disposed in the brake fluid conduit 51 between the reservoir 2 and an intersection of the fluid conduit 51 extending to the linear differential pressure control valve 70 and the fluid conduit 54 transmitting to the suction side of the pumps 241 and 242. The two-position valve 210, which is normally at a flow-through position, is disposed in the brake fluid conduit 262 extending from the master cylinder 203 to a portion of the fluid conduit 51 which is just before the linear differential pressure control valve 70. The master cylinder 203 is a tandem master cylinder having first and second fluid pressure rooms. Each of the first and second fluid pressure rooms is respectively connected with the fluid conduits 261 and 262, each of which extends to each of the front wheel cylinders 5 and 6 and the rear wheel cylinders 3 and 4.

If the stroke sensor 15 detects the depression of the brake pedal, the two-position valves 210 and 213 are switched to the shut-off position and the two-position valves 211 and 212 to the flow-through position. At the same time, the motor 245 is energized and the trochoid pumps 241, 242, 243 and 244 are driven. Thus, the fluid communication between the tandem cylinder 203 and the hydraulic unit 1 are completely shut off by the two-position valves 210 and 213 and each pressure of the wheel cylinders 3, 4, 5 and 6 can be electrically controlled, as shown in the FIGS. 2 and 3. This system constitutes not only a brake by wire system but also a conventional mechanical brake system. If a malfunction takes places in the brake by wire system, the pressure to the wheel cylinders 3, 4, 5 and 6 will be applied from the master cylinder 203 in response to the brake pedal depression by the driver, which brings an advantage from a fail safe standpoint. The adoption of a malfunction detecting system will make it available that if a malfunction such as a broken wire is detected, the control of the linear differential pressure control valves 70 and 80 and the other components will be prohibited.

(Fifth Embodiment)

Figure 9A:
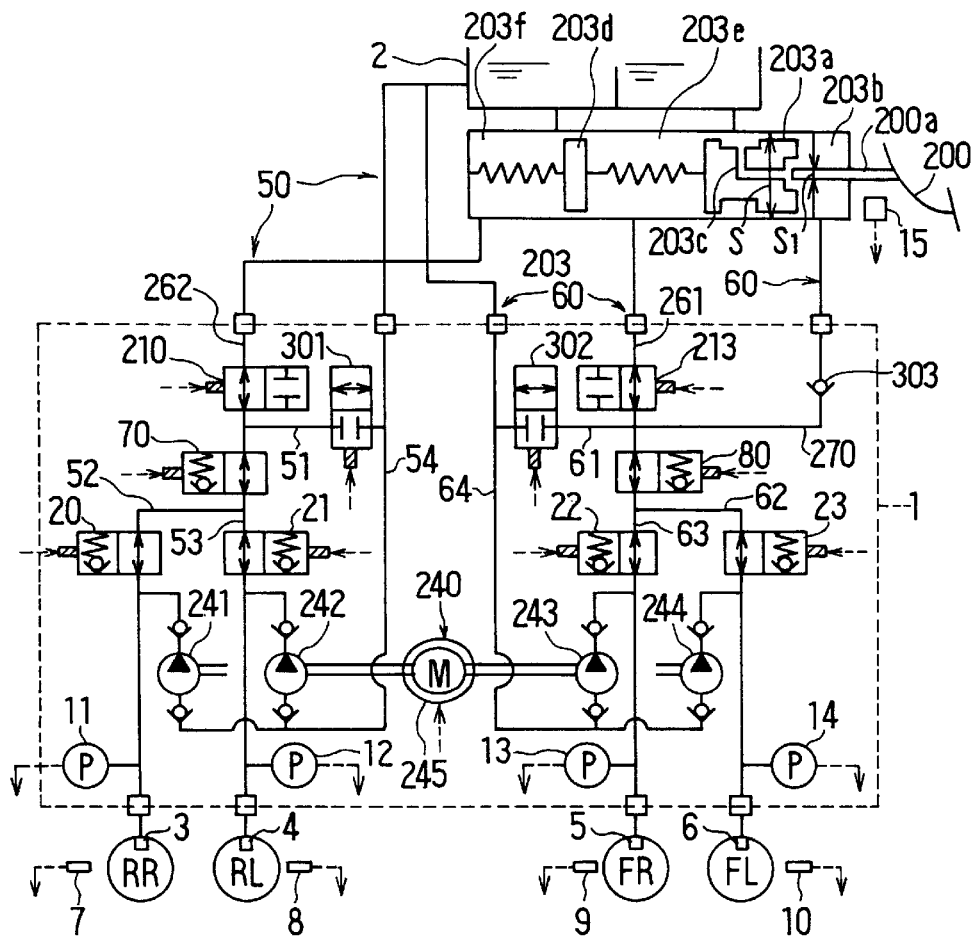
FIG. 9A is a schematic diagram of a brake system according to a fifth embodiment of the present invention.
Figure 9B:
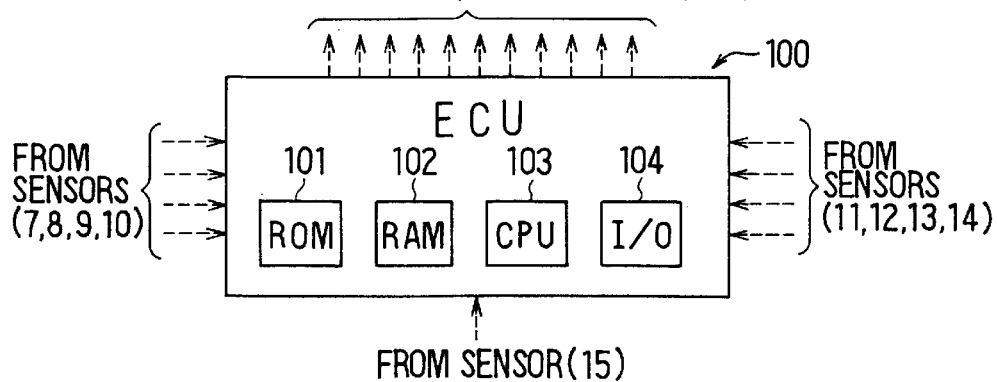
FIG. 9B is a schematic diagram of an electronic control unit in the fifth embodiment.

FIGS. 9A and 9B show a construction of a brake system according to a fifth embodiment of the present invention. The construction having the same function and effect as those of the construction described in FIGS. 8A and 8B has the same reference number as that of FIGS. 8A and 8B and its explanation will be omitted.

In the fourth embodiment shown in the FIG. 8A, the two-position valve 211 is disposed in the fluid conduit between the reservoir 2 and the intersection of the fluid conduit 51 extending to the linear differential pressure control valve 70 and the fluid conduit 54 transmitting to the suction side of the pumps 241 and 242 and, further, the two-position valve 212 is disposed in the fluid conduit between the reservoir 2 and the intersection of the fluid conduit 61 extending to the linear differential pressure control valve 80 and the fluid conduit 64 transmitting to the suction side of the pumps 243 and 244. However, in the fifth embodiment shown in FIG. 9A, the two-position valves 301 and 302 are disposed respectively in the conduits 51 and 61, in place of the two position valves 211 and 212. The fluid pressure rooms 203e and 203f of the master cylinder 203 are respectively connected to the conduits 261 and 262. There is provided with a fluid conduit 270 which connects a servo room 203b to the intersection of the conduit 261 and the conduit 61 between the two-position valve 212 and the linear differential pressure control valve 80. A non-return valve 303 is disposed in the conduit 270 in order to prevent the reverse flow of brake fluid from the servo room 203b when a driver depresses a brake pedal.

A piston 203a in the master cylinder 203 is provided with a conduit 203c in order to flow through the fluid from the reservoir 2 to the servo room 203c. The flow through or the shut off control of the fluid between the reservoir 2 and the servo room 203c will be performed by an end portion of a bush rod 200a connected with the brake pedal 200. A groove provided at an outer circumference of the piston 203a communicating with the conduit 203c is opened to an inlet portion of the reservoir 2 all over the distance where the piston 203a moves according to the depression of the bush rod 200a so as to allow the conduit 203c to connect to the reservoir 2. The outer surface of the piston 203a is provided with sealing material not shown in this drawing in order to seal the space between the groove of the piston 203a and the servo room 203b and between the groove of the piston 203a and the fluid pressure room 203e. The outer surface of an intermediate piston 203d is also provided with sealing material not shown in this drawing in order to seal the space between the fluid pressure rooms 203e and 203f. The servo room 203b serves to reduce a reaction force of the brake pedal 200 by the application of the fluid pressure. In another word, a master cylinder pressure which is higher than the master cylinder pressure to be induced only by the driver's brake pedal depression can be obtained in cooperation with the fluid pressure room 203e.

The operation of this system will be explained in the case of the brake control for the front wheel. If the function of the ECU 100 is normal and the stroke sensor 15 detects the depression of the brake pedal, the two-position valve 213 is switched to the shut-off position and the two-position valve 302 to the flow-through position and the linear differential pressure control valve 80 is ready to be energized to control the differential pressure. At the same time, the motor 245 is energized and the trochoid pumps 241, 242, 243 and 244 are driven. Thus, the fluid communication between the fluid pressure rooms 203e and 203f of the tandem cylinder 203 and the hydraulic unit 1 are completely shut off by the two-position valves 210 and 213 and each pressure of the wheel cylinders 5 and 6 can be electrically controlled by the commanded current to the linear differential pressure control valve 80, as described in the second embodiment of the present invention.

Next, if the ECU 100 encounters a malfunction (such as a failure of CPU or sensors and the processes by the ECU are inhibited), but a brake operation is required, the motor 245 can be driven, not through the ECU but directly, by an electric signal of the stop lamp(well known and not shown in this drawing) or the stroke sensor 15 which is generated when the brake pedal is substantially depressed. At this time, as the current supply to respective control valves can not be controlled because of the malfunction of the ECU and the inhibition of its processes, the two-position valve 302 is at the shut-off position, the two-position valve 213 at the flow-through position and the linear differential control valves 80, 22 and 23 at the flow-through position. Therefor, the brake fluid discharged from the trochoid pumps 243 and 244 is supplied to the servo room 203b of the master cylinder 203.

As the area (S) of the end surface of the piston 203a is larger than the area (S1) of the end surface of the bush rod 200a, assuming that the brake fluid pressure in the servo room 203b is P, the surface pressure (SP) applied to the end surface of the piston 203a is larger than the surface pressure (SP1) to the end surface of the bush rod 200a. This means a servo mechanism which serves to apply to the piston 203a a higher pressure than the depression pressure by the driver (pressure ratio; S/S1). As described above, if the motor can be driven at the time of the brake requirement, even when the ECU encounters the malfunction, the higher pressure than the driver's depression pressure can be produced as a master cylinder pressure.

Figure 10A:
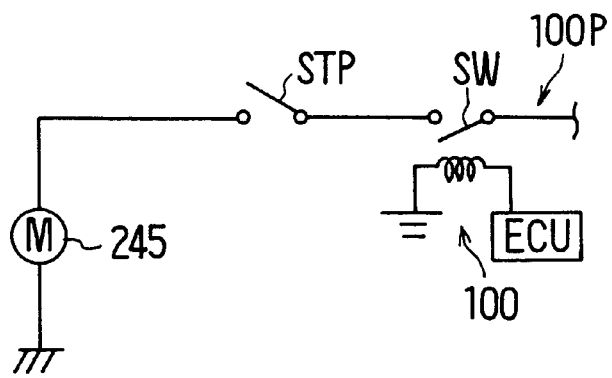
FIG. 10A is a relay circuit for driving a motor.

FIG. 10A shows a relay circuit 100P for driving the motor 245, when the ECU encounters a malfunction. As shown in this drawing, a relay switch SW can be automatically switched on by a signal representing that the ECU encounters an malfunction. Then, the motor can be driven in responsive to only the on or off state of the stop lamp switch STP.

Figure 10B:
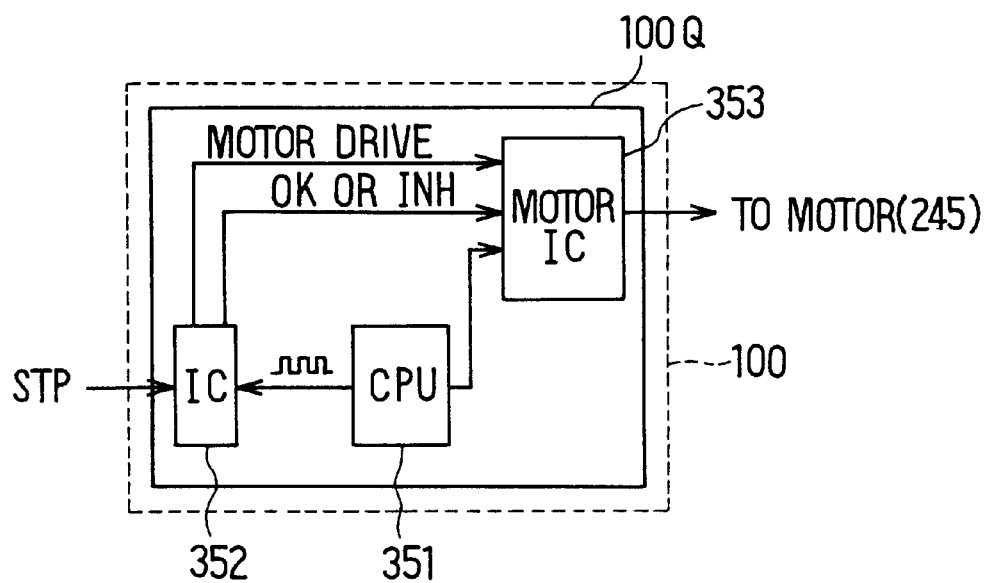
FIG. 10B is an alternative relay circuit for driving a motor.

FIG. 10B shows an alternative relay circuit 100Q for driving the motor 245 which is constituted in the ECU. In the case that the ECU is normally functioned, a IC 352 generates a OK signal based on normal pulse signals from a CPU 351 upon receipt of a signal representing that the stop lamp switch STP is switched on. The OK signal is transmitted to a motor driving IC 353 so that the motor driving IC 353 may serve to supply a current to the motor 245 in accordance with a control signal generated from the CPU 351. On the other hand, in the case that the ECU is not functioned normally, the IC 352 generates an inhibition signal based on abnormal pulse signals from the CPU 351 upon receipt of a signal representing that the stop lamp switch STP is switched on. The inhibition signal is transmitted to a motor driving IC 353 so that the motor driving IC 353 may serve to supply a current to the motor 245 in accordance with signals for driving the motor generated from the IC 352, inhibiting a control signal generated from the CPU 351. As mentioned above, in the case of the malfunction of the ECU, the motor 245 can be driven without using the control signals from the ECU only by the signal of the stop lamp switch STP.

This brake system also has an advantage, same as in the first to fourth embodiments, that, as an identical pressure may be applied to each of the wheel cylinders 5 and 6, the adjustment operation regarding the fluctuation of the wheel cylinder pressure sensors can be very easily performed.

Figure 11:
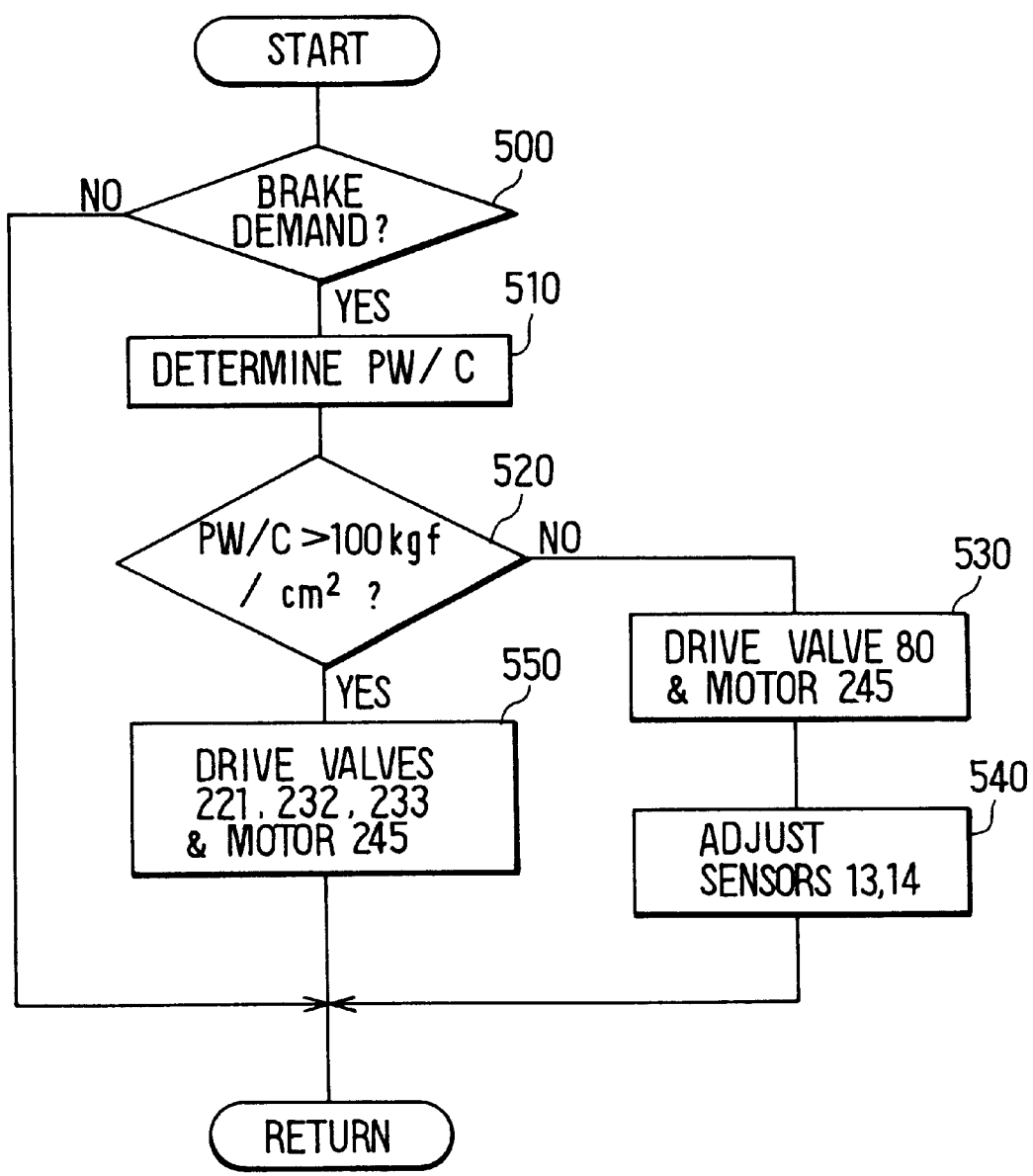
FIG. 11 is a flow chart for adjusting a fluctuation error of wheel cylinder pressure sensors.

FIG. 11 shows a flow chart for adjusting the fluctuation of the pressure sensors. At a step 500, it is judged whether or not a brake demand by a driver exists. This will be judged by a signal from the stroke sensor 15. If the answer is affirmative, the process goes to a step 510 where an aimed wheel cylinder pressure is determined according to an amount of the brake demand by the driver such as a brake stroke length. If the answer is negative, the process is ended. At a step 520, whether the existing wheel pressure is more than 100 kgf/cm$^2$ is judged. A value of 90 kgf/cm$^2$ may be used in consideration of the maximum holding pressure of the linear differential pressure control valve, as explained in the FIG. 6A. If the answer is negative, the process goes to a step 530 where the linear differential pressure control valve 80 is controlled to its differential pressure producing position and the motor 245 is driven so that each pressure of the wheel cylinders 5 and 6 may be increased. As both of the linear differential pressure control valves 22 and 23 are kept at their shut-off positions, each pressure of the wheel cylinders 5 and 6 becomes identical. At this time, if the detected values of the pressure sensors 13 and 14 are different each other, there exists a fluctuation error of the detected values of the pressure sensors 13 and 14 and, therefor, the detected values may be adjusted to eliminate the fluctuation error. If the answer is affirmative at the step 520, the process goes to a step 550. Though the step 550 is not the process for adjusting the fluctuation errors of the detected values of the pressure sensors, this process may be used to confirm whether the adjustment has been complete. When the aimed wheel cylinder pressure is more than 100 kgf/cm$^2$, each of the linear differential pressure control valves 22 and 23 is energized in addition to the current supply to the linear differential pressure control valve 80 and the motor is driven so that each of the wheel cylinder pressure may be independently controlled to achieve the aimed pressure. At this time, unless each value of the duty rate current to each of the linear differential pressure control valves 22 and 23 is same, it may be presumed that the error adjustment is not complete.

As only the linear differential pressure control valve 80 is energized always at an early stage of braking operation and the detected values of the pressure sensors 5 and 6 can be adjusted in order to obtain the same values, an accurate independent brake control can be secured for each of the wheel cylinder pressures.

At the time of the malfunction of the ECU 100, each of the valves in the brake conduit line 50 for the rear wheels keeps its valve member position as shown in the drawing which is the same in the brake conduit line 60 for the front wheels. However, the pressure of the second master cylinder room 203f, which is the same pressure of the first master cylinder room 203e, directly induced by the driver's brake pedal operation and further enhanced by the servo function of the servo room 203b will be applied to the wheel cylinders 3 and 4 to obtain a sufficient braking force to each of the rear wheels.

In the case that the ECU 100, especially the CPU 103, is normal, the brake by wire system can work, as described in the second embodiment of the present invention. In the case that the ECU 100 or the CPU is abnormal, the master cylinder pressure higher than the pressure responsive to the driver's direct depression force is applied to the wheel cylinders even without a conventional brake booster, but with a help of the pump motor 240 driven separately. Even when both of the ECU and the pump motor 240 encounter the malfunction, the master cylinder pressure responsive to the driver's direct depression force may be applied to the wheel cylinders.

As mentioned above, when the ECU 100 is normal and the braking operation is required, each of the two-position valves 301 and 302 turns to the flow-through position. However, if only the two-position valve 301 turns to the flow-through position and the two-position valve 302 is kept at the shut-off position, the brake fluid discharged from the pump and passed through the linear differential pressure control valves 22, 23 and 80 can not be returned, but transmitted to the servo room 203b. While the brake fluid discharged from the pump is mainly used to supply to the wheel cylinders, only the excessive brake fluid is transmitted. This will serve to produce a servo function for the driver's depression force which gives an enhanced force against both of the master cylinder pressure rooms 203e and 203f. Thus, the brake pedal depression feeling will be improved.

Sixth Embodiment

Figure 12:
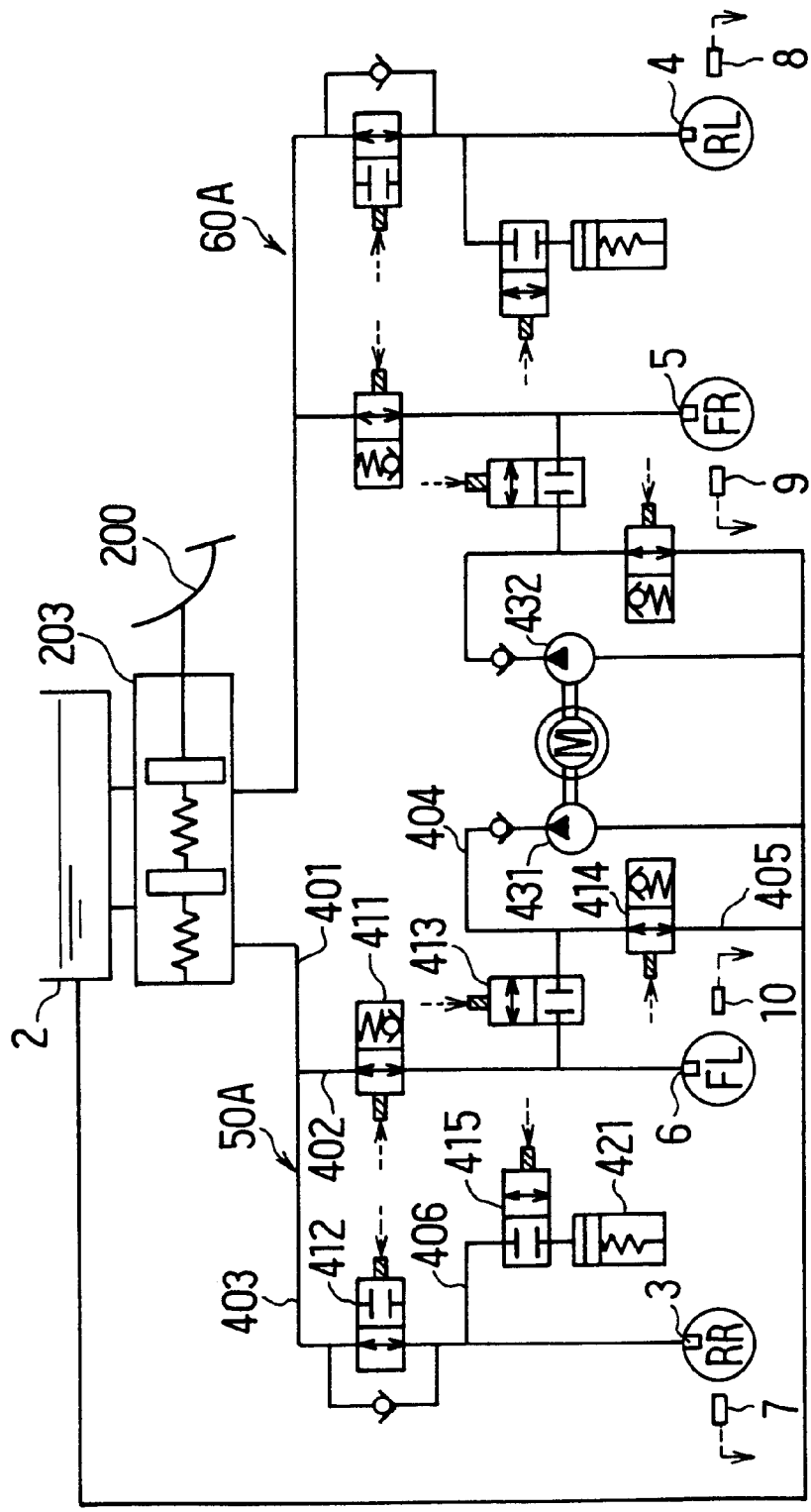
FIG. 12 is a schematic diagram of a brake system according to a sixth embodiment of the present invention.

FIG. 12 shows a brake system according to a sixth embodiment of the present invention. This system is provided with a X type brake fluid conduit arrangement constituted by a first conduit line 50A connecting a front left wheel cylinder 6 and a rear right wheel cylinder 3 to one pressure room of the master cylinder 203 and a second conduit line 60A connecting a front right wheel cylinder 5 and a rear left wheel cylinder 4 to the other pressure room of the master cylinder 203. As the construction of the second conduit line 60A is same as that of the first conduit line 50A, the detail explanation of the brake system of this embodiment will be made hereinafter with respect to the first conduit line 50A.

The first conduit line 50A comprises a fluid conduit 401 extending from the master cylinder 203 and two fluid conduits 402 and 403 which are branched out from the fluid conduit 401, as shown in the FIG. 12. One of the branched out fluid conduit 402 is transmitted to the front left wheel cylinder 6 and the other of the branched out fluid conduit 403 to the rear right wheel cylinder 3. A linear differential pressure control valve 411 having a flow-through position and a differential pressure producing position is disposed in the conduit 402. A fluid conduit 404 extending from the reservoir 2 is connected with the conduit 402 between the linear differential pressure control valve 411 and the wheel cylinder 6. A pump 431 is disposed in the conduit 404 in order to suck the brake fluid from the reservoir 2 and discharge the same to the conduit 402 between the linear differential pressure control valve 411 and the wheel cylinder 6. A two-position valve 413 having a flow-through position and a shut-off position is disposed in the conduit 404 at a down stream of the discharge side of the pump 431. There is provided with a fluid conduit 405 connecting the conduit 404 between the two-position valve 413 and the discharge side of the pump 431 to the suction side of the pump 431 of the conduit 404. A linear differential pressure control valve 414 having a flow-through position and a differential pressure producing position is disposed in the conduit 405.

The fluid conduit 403 is provided with a two-position valve 412 having a flow-through position and a shut-off position. A fluid conduit 406 is connected with the conduit 403 between the two-position valve 412 and the wheel cylinder 5 and is provided with a reservoir 421 and a two-position valve 415 having a flow-through position and a shut-off position so as to allow the brake fluid to run to the reservoir 421 for releasing the wheel cylinder pressure at the time of an anti-skid control or the like. Each valve member position of the valves shown in the drawing is at the time when the valve is not energized.

At a normal operation of this system, the linear differential pressure control valve 411 is controlled at the differential pressure producing position, the two-position valve 413 at the flow-through position and the linear differential pressure control valve 414 at the differential pressure producing position, while the pump 431 is driven. Then, the pump 431 discharges the brake fluid sucked from the reservoir 2 to the conduit 402 and the linear differential pressure control valve 411 is actuated in order to control the pressure between the master cylinder 203 and the wheel cylinder 4 to a predetermined differential pressure so that an aimed braking force may be applied to the front left wheel. On the other hand, as the two-position valve 412 in the conduit 403 is kept at the flow-through position, a braking force is applied to the rear right wheel with the pressure same as the master cylinder pressure.

At an anti-skid control operation of this system, the front left wheel cylinder pressure can be decreased or increased by changing at the duty control each of the valve member positions of the two-position valve 413 and the linear differential pressure control valve 414.

As mentioned above, this brake system is constituted by a hybrid brake by wire and mechanical brake system.

(Other Embodiments)

In each embodiments mentioned above, it may be easily realized to employ an anti-skid control. In this case, a slip of each wheel will be detected by the wheel velocity based on each signal of the wheel speed sensors 7, 8, 9 and 10 and each of the differential pressure control valves may be energized to control each of the wheel cylinder pressures so that an adequate wheel slip condition may be secured.

In each of the second to fifth embodiments, it is possible to incorporate a control by learning flow regarding the fluctuation adjustment of the detected wheel cylinder pressures from the sensors 11, 12, 13 and 14 in the brake by wire control flow.

The brake fluid conduit line for the front right and left wheels in the third embodiment may be controlled as the brake by wire system as described in the fourth embodiment.

Though the pressure sensors 11, 12, 13 and 14 are disposed respectively for each wheel cylinders in the embodiments mentioned above, it is possible to employ only one pressure sensor in each of the brake fluid conduit lines 50 and 60 in the second to fifth embodiments. For example, if a pressure is disposed in the brake fluid conduit within the area surrounded by three of the linear differential pressure control valves 20, 21 and 70 in the FIG. 4A, the pressure in each of the wheel cylinders can be presumed by the duty rate current applied to each of the linear differential pressure control valves 20 and 21.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A brake system for vehicles comprising:

first and second brake fluid conduits, a reservoir connected to one side of each of said first and second brake fluid conduits for storing excess brake fluid coming through said first and second brake fluid conduits, a first wheel cylinder for producing braking force, which is connected to the other side of said first brake fluid conduit, a first linear differential pressure control valve normally at a flow-through position provided in said first brake fluid conduit, and a first electrically driven pump, which sucks brake fluid from said second brake fluid conduit extending to said reservoir and discharges brake fluid to a portion of said first brake fluid conduit between said first linear differential pressure control valve and said first wheel cylinder, wherein said first linear differential pressure control valve controls linearly the brake fluid flowing from a wheel cylinder side to a reservoir side so that the brake fluid pressure of said wheel cylinder side may be linearly variable and become higher than that of said reservoir side by the amount to be determined in accordance with a current commanded to said first linear differential pressure control valve.

2. A brake system for vehicles comprising:

first and second brake fluid conduits, a reservoir connected to one side of each of said first and second brake fluid conduits for storing excess brake fluid coming through said first and second brake fluid conduits, a first wheel cylinder for producing braking force, which is connected to the other side of said first brake fluid conduit, a first linear differential pressure control valve normally at a flow-through position provided in said first brake fluid conduit, a first electrically driven pump, which sucks brake fluid from said second brake fluid conduit extending to said reservoir and discharges brake fluid to a portion of said first brake fluid conduit between said first linear differential pressure control valve and said first wheel cylinder, and a second linear differential pressure control valve normally at a flow-through position provide in series with said first linear differential pressure control valve in said first brake fluid conduit between said reservoir and said first linear differential pressure control valve, wherein said first linear differential pressure control valve controls linearly the brake fluid flowing from a wheel cylinder side to a reservoir side so that the brake fluid pressure of said wheel cylinder side may be linearly variable and become higher than that of said reservoir side by the amount to be determined in accordance with a current commanded to said first linear differential pressure control valve, and wherein said second linear differential pressure control valve controls linearly the brake fluid flowing from a side of said first linear differential pressure control valve to a reservoir side so that the brake fluid pressure at the side of first linear differential pressure control valve may be linearly variable and become higher than that of said reservoir side by an amount to be determined in accordance with the current commanded to said second linear differential pressure control valve and, thereby, the pressure of said wheel cylinder is increased by a step by step control of said first and second linear differential pressure control valves.

3. A brake system for vehicles comprising:

first and second brake fluid conduits, a reservoir connected to one side of each of said first and second brake fluid conduits for storing excess brake fluid coming through said first and second brake fluid conduits, a first wheel cylinder for producing braking force, which is connected to the other side of said first brake fluid conduit, a first linear differential pressure control valve normally at a flow-through position provided in said first brake fluid conduit, a first electrically driven pump, which sucks brake fluid from said second brake fluid conduit extending to said reservoir and discharges brake fluid to a portion of said first brake fluid conduit between said first linear differential pressure control valve and said first wheel cylinder, wherein said first linear differential pressure control valve controls linearly the brake fluid flowing from a wheel cylinder side to a reservoir side so that the brake fluid pressure of said wheel cylinder side may be linearly variable and become higher than that of said reservoir side by the amount to be determined in accordance with a current commanded to said first linear differential pressure control valve, a first branched conduit branched out from said first brake fluid conduit between said reservoir and said first linear differential pressure control valve, a second wheel cylinder for producing braking force, which is connected to the other side of said first branched conduit, and a second linear differential pressure control valve provided in said first branched conduit between said second wheel cylinder and the branched portion of said first branched conduit, wherein, while said first pump also discharges brake fluid to a portion of said first branched conduit between said second linear differential pressure control valve and said second wheel cylinder, said second linear differential pressure control valve controls linearly the brake fluid flowing from a wheel cylinder side to a reservoir side so that the brake fluid pressure of said wheel cylinder side may be linearly and become higher than that of said reservoir side by an amount to be determined in accordance with the current commanded to said second linear differential pressure control valve.

4. A brake system for vehicles according to claim 3, further comprising:

an electronic control unit connected in circuit to each of said first and second linear differential pressure control valves, and an electric signal generating device connected in circuit to said electronic control unit for generating an electric signal in response to the brake pedal depression, wherein said electronic control unit produces said current commanded independently to each of said first and second linear differential pressure control valves in accordance with said electric signal in order to allow the linear control of the fluid pressure difference between said reservoir and each of said first and second wheel cylinders.

5. A brake system for vehicles according to claim 3, further comprising:

a third linear differential pressure control valve normally at a flow-through position provided in said first brake fluid conduit between said reservoir and said branched portion to the first branched conduit, wherein said third linear differential pressure control valve controls linearly the brake fluid flowing from the respective side of said first and second linear differential pressure control valves to a reservoir side so that the brake fluid pressure of the respective side of said first and second linear differential pressure control valves may be linearly variable and become higher than that of said reservoir side by the amount to be determined in accordance with the current commanded to said third linear differential pressure control valve.

6. A brake system for vehicles according to claim 5, further comprising:

an electronic control unit connected in circuit to each of said first, second and third linear differential pressure control valves, and an electric signal generating device connected in circuit to said electronic control unit for generating an electric signal in response to the brake pedal depression, wherein said electronic control unit has an adjustment program for securing the same pressure in each of said first and wheel cylinders by actuating only said third linear differential pressure control valve when the wheel cylinder pressure is below a predetermined value, while producing said current commanded independently to each of said first, second and third linear differential pressure control valves for linear control in accordance with said electric signal.

7. A brake system for vehicles according to claim 1, further comprising:

a master cylinder for generating a master cylinder pressure in response to a brake pedal depression, which is disposed in said first brake fluid conduit between said reservoir and said first linear differential pressure control valve, a third brake fluid conduit, one side of which is connected to said first brake fluid conduit between said master cylinder and said first linear differential pressure control valve, a second wheel cylinder for producing braking force, which is connected to the other side of said third brake fluid conduit, and a first control valve normally at a flow-through position disposed in said third brake fluid conduit, whereby, said master cylinder pressure is transmitted to each of first and second wheel cylinders.

8. A brake system for vehicles according to claim 7, further comprising:
- a second control valve disposed in said second brake fluid conduit between the first pump discharge portion and the intersection to said first brake fluid conduit,
- a return conduit connecting the portion between the first pump discharge portion and said second control valve to the first pump suction portion in said second brake fluid conduit, and
- a third control valve disposed in said return conduit,
- wherein said second and third control valves control the increase or decrease of the wheel cylinder pressure.

9. A brake system for vehicles according to claim 3, further comprising:
- a master cylinder conduit, one side of which is connected to said first brake fluid conduit between said reservoir and said first linear differential pressure control valve,
- a master cylinder connected to the other side of said master cylinder conduit for generating a master cylinder pressure in response to a brake pedal depression, and
- a first control valve normally at a shut-off position disposed in said first brake fluid conduit between the reservoir and said branched portion to the first branched conduit or said intersection to the master cylinder conduit, the location of which is near said reservoir,
- whereby, said master cylinder pressure is transmitted to each of first and second wheel cylinders.

10. A brake system for vehicles according to claim 5, further comprising:
- a master cylinder conduit, one side of which is connected to said first brake fluid conduit between said reservoir and said third linear differential pressure control valve,
- a master cylinder connected to the other side of said master cylinder conduit for generating a master cylinder pressure in response to a brake pedal depression, and
- a first valve normally at a shut-off position disposed in said first brake fluid conduit between the reservoir and the intersection to said master cylinder conduit,
- whereby, said master cylinder pressure is transmitted to each of first and second wheel cylinders.

11. A brake system for vehicles according to claim 9, further comprising:
- a second control valve normally at a flow-through position disposed in said master cylinder conduit,
- wherein, after said first and second valves are turned to the flow-through position and the shut-off position, respectively, each of said first and second linear differential pressure control valves controls the pressure of said first and second wheel cylinders, respectively.

12. A brake system for vehicles according to claim 10, further comprising:
- a second control valve normally at a flow-through position disposed in said master cylinder conduit,
- wherein, after said first and second valves are turned to the flow-through position and the shut-off position, respectively, each of said first, second and third linear differential pressure control valves controls the pressure of said first and second wheel cylinders, respectively.

13. A brake system for vehicles according to claim 5, further comprising:
- a third brake fluid conduit, one side of which is connected to said reservoir,
- a third wheel cylinder for producing braking force, which is connected to the other side of said third brake fluid conduit,
- a second branched conduit branching out from said third brake fluid conduit between said reservoir and said third wheel cylinder,
- a fourth wheel cylinder for producing braking force, which is connected to said second branched conduit,
- a master cylinder for generating a master cylinder pressure in response to a brake pedal depression, which is connected in said third brake fluid conduit between said reservoir and said branched portion to the second branched conduit, and
- whereby said master cylinder pressure is transmitted to both of third and fourth wheel cylinders.

14. A brake system for vehicles according to claim 5, further comprising:
- a third brake fluid conduit, one side of which is connected to said reservoir,
- a third wheel cylinder for producing braking force, which is connected to the other side of said third brake fluid conduit,
- a second branched conduit branching out from said third brake fluid conduit between said reservoir and said third wheel cylinder,
- a master cylinder conduit, one side of which is connected to said third brake fluid conduit between said reservoir and said third wheel cylinder,
- a master cylinder connected to the other side of said master cylinder conduit for generating a master cylinder pressure in response to a brake pedal depression
- a fourth wheel cylinder for producing braking force, which is connected to said second branched conduit, and
- a first control valve normally at a shut-off position disposed in said third brake fluid conduit between the reservoir and said branched portion to the second branched conduit or said intersection to the master cylinder conduit, the location of which is near said reservoir,
- whereby said master cylinder pressure is transmitted to each of third and fourth wheel cylinders.

15. A brake system for vehicles according to claim 14, further comprising:
- a fourth brake fluid conduit, the one side of which is connected to said reservoir,
- a second electrically driven pump, which sucks brake fluid from said fourth brake fluid conduit extending to said reservoir and discharges brake fluid to a portion of said third brake fluid conduit between said branched portion to the second branched conduit and said third wheel cylinder and to a portion of said second branched conduit between said branched portion to the third brake fluid conduit and said fourth wheel cylinder, respectively,
- a second control valve normally at a flow-through position disposed in said master cylinder conduit between said master cylinder and said intersection to the third fluid conduit line, and
- a fourth linear differential pressure control valve normally at a flow-through position disposed in said third brake fluid conduit between said intersection to the master cylinder conduit and said branched portion to the second branched conduit, wherein, after said first and second control valves are turned to the flow-through position and the shut-off position, respectively, said fourth linear differential pressure control valve controls linearly the brake fluid flowing from a wheel cylinder side to a reservoir side so that the brake fluid pressure of said wheel cylinder side may be linearly variable and become higher than that of said reservoir side by the amount to be determined in accordance with the current commanded to said fourth linear differential pressure control valve.

16. A brake system for vehicles according to claim 15, further comprising:
a fifth linear differential pressure control valve normally at a flow-through position disposed in said third brake fluid conduit between said branched portion to the second branched conduit and the portion where the brake fluid from said second pump is discharged,
a sixth differential pressure control valve normally at a flow-through position disposed in said second branched conduit between said branched portion to said third brake fluid conduit and the portion where the brake fluid from said second pump is discharged,
wherein each of said fifth and sixth linear differential pressure control valves controls linearly the brake fluid flowing from a wheel cylinder side to a side of said fourth linear differential pressure control valve so that the brake fluid pressure of said wheel cylinder side may be linearly variable and become higher than that of the side of said fourth linear differential pressure control valve by the amount to be determined in accordance with the current commanded independently to each of said fifth and sixth linear differential pressure control valves.

17. A brake system for vehicles according to claim 16, further comprising:
an electronic control unit connected in circuit to each of said first to sixth linear differential pressure control valves, and
an electric signal generating device connected in circuit to said electronic control unit for generating an electric signal in response to the state of the brake pedal depression,
wherein said electronic control unit controls said current commanded independently to each of said first to sixth linear differential pressure control valves in accordance with said electric signal in order to allow a linear control of the pressure difference between a upstream and a downstream of each of said first to sixth linear differential pressure control valves.

18. A brake system for vehicles according to claim 17, wherein said electric signal generating device includes a sensor for generating an operation signal showing the brake pedal depression operation, and said electronic control unit includes a valve actuating circuit for changing the valve positions of said first and second control valves upon receipt of said operation signal.

19. A brake system for vehicles according to claim 14, further comprising:
a second control valve normally at a flow-through position disposed in said master cylinder conduit,
a fourth differential pressure control valve normally at a flow-through position disposed in said third brake fluid conduit between said intersection to the master cylinder conduit at a reservoir side and said branched portion to the second branched conduit at a wheel cylinder side,
a fourth brake fluid conduit, the one side of which is connected to said third brake fluid conduit between said first control valve and said fourth differential pressure control valve, and
a second electrically driven pump, which sucks brake fluid from said fourth brake fluid conduit and discharges brake fluid to a portion of said third brake fluid conduit between said branched portion to the second branched conduit and said third wheel cylinder and to a portion of said second branched conduit between said branched portion to the fourth brake fluid conduit and said fourth wheel cylinder, respectively,
wherein, after said first and second control valves are turned to the flow-through position and the shut-off position, respectively, said fourth linear differential pressure control valve controls the brake fluid flowing from a wheel cylinder side to a reservoir side so that the brake fluid pressure of said wheel cylinder side may be higher than that of said reservoir side by the amount to be determined in accordance with the current commanded to said fourth linear differential pressure control valve.

20. A brake system for vehicles according to claim 19, further comprising:
a fifth differential pressure control valve normally at a flow-through position disposed in said third brake fluid conduit between said branched portion to the second branched conduit and the portion where the brake fluid from said second pump is discharged, and
a sixth differential pressure control valve normally at a flow-through position disposed in said second branched conduit between said branched portion from the third brake fluid conduit and the portion where the brake fluid from said second pump is discharged,
wherein each of said fifth and sixth linear differential pressure control valves controls the brake fluid flowing from a wheel cylinder side to a side of said fourth linear differential pressure control valve so that the brake fluid pressure of said wheel cylinder side may be higher than that of the side of said fourth linear differential pressure control valve by the amount to be determined in accordance with the current commanded independently to each of said fifth and sixth linear differential pressure control valves.

21. A brake system for vehicles according to claim 20, further comprising:
an electronic control unit connected in circuit to each of said first to sixth linear differential pressure control valves, and
an electric signal generating device connected in circuit to said electronic control unit for generating an electric signal in response to the state of the brake pedal depression,
wherein said electronic control unit controls said current commanded independently to each of said first to sixth linear differential pressure control valves in accordance with said electric signal.

22. A brake system for vehicles according to claim 21, wherein said electric signal generating device includes a sensor for generating an operation signal showing the brake pedal depression operation, and said electronic control unit includes a valve actuating circuit for changing the valve positions of said first and second control valves upon receipt of said operation signal.

23. A brake system for vehicles according to claim 5, further comprising:
an electronic control unit connected in circuit to each of said first, second and third linear differential pressure control valves, and an electric signal generating device connected in circuit to said electronic control unit for generating an electric signal in response to the brake pedal depression, wherein said electronic control unit has a program for judging an urgent braking state based on said electric signal and, when the urgent braking state is not judged, not actuating first and second linear differential pressure control valves, but actuating said third linear differential pressure control valve to produce said current commanded only to said third linear differential pressure control valve in accordance with said electric signal.

24. A brake system for vehicles according to claim 5, further comprising:

an electronic control unit connected in circuit to each of said first, second and third linear differential pressure control valves, and an electric signal generating device connected in circuit to said electronic control unit for generating an electric signal in response to the brake pedal depression, wherein said electronic control unit has a program for judging a slip of each of wheels for an anti-skid function based on said electric signal and, when it is not necessary to execute said anti-skid control function, not actuating first and second linear differential pressure control valves, but actuating said third linear differential pressure control valve to produce said current commanded only to said third linear differential pressure control valve in accordance with said electric signal.

25. A brake system for vehicles according to claim 5, wherein the maximum holding pressure of each of said first and second linear differential pressure control valves is same as that of said third linear differential pressure control valve.

26. A brake system for vehicles according to claim 25, wherein a sum of the maximum holding pressure of each of said first and second linear differential pressure control valves and that of said third linear differential pressure control valve is equal to the pressure required in this braking system as a maximum wheel cylinder pressure for producing necessary braking force.

27. A brake system for vehicles according to claim 12, further comprising:

a third brake fluid conduit, one side of which is connected to said reservoir, a third wheel cylinder for producing braking force, which is connected to the other side of said third brake fluid conduit, a second branched conduit branching out from said third brake fluid conduit between said reservoir and said third wheel cylinder, an another master cylinder conduit, one side of which is connected to said third brake fluid conduit between said reservoir and said third wheel cylinder and the other side of which is connected said master cylinder, a fourth wheel cylinder for producing braking force, which is connected to said second branched conduit, and a third control valve normally at a shut-off position disposed in said third brake fluid conduit between the reservoir and said branched portion to the second branched conduit or said intersection to the master cylinder conduit, the location of which is near said reservoir, whereby said master cylinder pressure is transmitted to each of first, second, third and fourth wheel cylinders.

28. A brake system for vehicles according to claim 27, further comprising:

a fourth brake fluid conduit, the one side of which is connected to said reservoir, a second electrically driven pump, which sucks brake fluid from said fourth brake fluid conduit extending to said reservoir and discharges brake fluid to a portion of said third brake fluid conduit between said branched portion to the second branched conduit and said third wheel cylinder and to a portion of said second branched conduit between said branched portion to the third brake fluid conduit and said fourth wheel cylinder, respectively, a fourth control valve normally at a flow-through position disposed in said another master cylinder conduit between said master cylinder and said intersection to the third fluid conduit line, and a fourth differential pressure control valve normally at a flow-through position disposed in said third brake fluid conduit between said intersection to the another master cylinder conduit and said branched portion to the second branched conduit, wherein, after said third and fourth control valves are turned to the flow-through position and the shut-off position, respectively, said fourth linear differential pressure control valve controls the brake fluid flowing from a wheel cylinder side to a reservoir side so that the brake fluid pressure of said wheel cylinder side may be higher than that of said reservoir side by the amount to be determined in accordance with the current commanded to said fourth linear differential pressure control valve.

29. A brake system for vehicles according to claim 28, further comprising:

a fifth differential pressure control valve normally at a flow-through position disposed in said third brake fluid conduit between said branched portion to the second branched conduit and the portion where the brake fluid from said second pump is discharged, and a sixth differential pressure control valve normally at a flow-through position disposed in said second branched conduit between said branched portion to said third brake fluid conduit and the portion where the brake fluid from said second pump is discharged, wherein each of said fifth and sixth linear differential pressure control valves controls the brake fluid flowing from a wheel cylinder side to a side of said fourth linear differential pressure control valve so that the brake fluid pressure of said wheel cylinder side may be higher than that of the side of said fourth linear differential pressure control valve by the amount to be determined in accordance with the current commanded independently to each of said fifth and sixth linear differential pressure control valves.

30. A brake system for vehicles according to claim 5, further comprising:

a master cylinder conduit, one side of which is connected to said first brake fluid conduit between said reservoir and said third linear differential pressure control valve, a master cylinder connected to the other side of said master cylinder conduit for generating a master cylinder pressure in response to a brake pedal depression, a first control valve normally at a shut-off position disposed in said first brake fluid conduit between the reservoir and the intersection to said master cylinder conduit, wherein said second brake fluid conduit is connected to said reservoir through said first valve, a second control valve normally at a flow-through position disposed in said master cylinder conduit, wherein said taster cylinder pressure is transmitted to each of first and second wheel cylinders and, when said first and second valves are turned to the flow-through position and the shut-off position, respectively, each of said first, second the pressure of said first and second wheel cylinders, respectively.

31. A brake system for vehicles according to claim 30, further comprising:

a third brake fluid conduit, one side of which is connected to said reservoir, a third wheel cylinder for producing braking force, which is connected to the other side of said third brake fluid conduit, a second branched conduit branching out from said third brake fluid conduit between said reservoir and said third wheel cylinder, an another master cylinder conduit, one side or which is connected to said third brake fluid conduit between said reservoir and said third wheel cylinder and the other aide of which is connected to said master cylinder, a fourth wheel cylinder for producing braking force, which is connected to said second branched conduit, and a third control valve normally at a shut-off position disposed in said third brake fluid conduit between the reservoir and said intersection to the master cylinder conduit, a fourth control valve normally at a flow-through position disposed in said another master cylinder conduit, a fourth differential pressure control valve normally at a flow-through position disposed in said third brake fluid conduit between said intersection to the master cylinder conduit at a reservoir side and said branched portion to the second branched conduit at a wheel cylinder side, a fourth brake fluid conduit, the one side of which is connected to said third brake fluid conduit between said third control valve and said fourth differential pressure control valve, and a second electrically driven pump, which sucks brake fluid from said fourth brake fluid conduit and discharges brake fluid to a portion of said third brake fluid conduit between said branched portion to the second branched conduit and said third wheel cylinder and to a portion of said second branched conduit between said branched portion to tho fourth brake fluid conduit and said fourth wheel cylinder, respectively, wherein, said master cylinder pressure is transmitted to each of third and fourth wheel cylinders and, when said third and fourth control valves are turned to the flow-through position and the shut-off position, respectively, said fourth linear differential pressure control valve controls the brake fluid flowing from a wheel cylinder side to a reservoir side so that the brake fluid pressure of said wheel cylinder side may be higher than that of said reservoir side by the amount to be determined in accordance with the current commanded to said fourth linear differential pressure control valve.

32. A brake system for vehicles according to claim 31, further comprising:

a fifth differential pressure control valve normally at a flow-through position disposed in said third brake fluid conduit between said branched portion to the second branched conduit and the option where the brake fluid from said second pump is discharged, and a sixth differential pressure control valve normally at a flow-through position disposed in said second branched conduit between said branched portion from the third brake fluid conduit and the portion where the brake fluid from said second pump is discharged, wherein each of said fifth and sixth linear differential pressure control valves controls the brake fluid flowing from a wheel cylinder side to a side of said fourth linear differential pressure control valve so that the brake fluid pressure of said wheel cylinder side may be higher than that of the side of said fourth linear differential pressure control valve by the amount to be determined in accordance with the current commanded independently to each of said fifth and sixth linear differential pressure control valves.

33. A brake system for vehicles according to claim 29 or 32, wherein said master cylinder has first and second pressure rooms which are connected to said master cylinder conduit and said another master cylinder conduit.

34. A brake system for vehicles according to claim 12, further comprising:

a servo room provided in said Master cylinder for enhancing a brake pedal depression force, a servo conduit, one side of which is connected to said servo room and the other side of which to said first brake fluid conduit between said first control valve and said third linear differential pressure control valve, sensors for generating an electric signal in response to the state of the brake pedal depression, including a sensor for generating an operation signal showing the brake pedal depression operation, an electronic control unit connected in circuit to each of said first to third linear differential pressure control valves and to each of first and second control valves for changing the valve member positions of said first and second control valves and generating said current commanded independently to each of said first to third linear differential pressure control valves in accordance with said electric signal, and a relay circuit for driving said first motor pump based on said operation signal, even if said electronic control unit fails to change said valve positions and to control said commanded current due to a malfunction of said electronic control unit or said sensors generating said electric signal, wherein the brake fluid discharged from said first motor pump is transmitted to said servo room through said servo conduit, irrelevant to said malfunction of said electronic control unit.

35. A brake system for vehicles according to claim 34, wherein said electronic control unit controls said second control valve to the shut-off position, while keeping said first control valve to the shut-off position, and further controls the current commanded to each of said first to third linear differential pressure control valves so that the brake fluid passed through said third linear differential pressure control valve may be transmitted to said servo room for inducing the servo function.

36. A brake system for vehicles according to claim 30, further comprising:

a servo room provided in said Master cylinder for enhancing a brake pedal depression force, a servo conduit, one side of which is connected to said servo room and the other side of which to said first brake fluid conduit between said first control valve and said third linear differential pressure control valve, sensors for generating an electric signal in response to the state of the brake pedal depression, including a sensor for generating an operation signal showing the brake pedal depression operation, an electronic control unit connected in circuit to each of said first to third linear differential pressure control valves and to each of first and second control valves for changing the valve member positions of said first and second control valves and generating said current commanded independently to each of said first to third linear differential pressure control valves in accordance with said electric signal, and a relay circuit for driving said first motor pump based on said operation signal, even if said electronic control unit fails to change said valve positions and to control said commanded current due to a malfunction of said electronic control unit or said sensors generating said electric signal, wherein the brake fluid discharged from said first motor pump is transmitted to said servo room through said servo conduit, irrelevant to said malfunction of said electronic control unit.

37. A brake system for vehicles according to claim 29, further comprising:

a servo room provided in said Master cylinder for enhancing a brake pedal depression force, a servo conduit, one side of which is connected to said servo room and the other side of which to said first brake fluid conduit between said first control valve and said third linear differential pressure control valve, sensors for generating an electric signal in response to the state of the brake pedal depression, including a sensor for generating an operation signal showing the brake pedal depression operation, an electronic control unite connected in circuit to each of said first to sixth linear differential pressure control valves and to each of first to fourth control valves for changing the valve member positions of said first to fourth control valves and generating said current commanded independently to each of said first to sixth linear differential pressure control valves in accordance with said electric signal, and a relay circuit for driving said first and second motor pumps based on said operation signal, even if said electronic control unit fails to change said valve positions and to control said commanded current due to a malfunction of said electronic control unit or said sensors generating said electric signal, wherein the brake fluid discharged from said first motor pump is transmitted to said servo room through said servo conduit, irrelevant to said malfunction of said electronic control unit.

38. A brake system for vehicles according to claim 37, wherein said electronic control unit controls said second control valve to the shut-off position, while keeping said first control valve to the shut-off position, and said fourth control valve to the shut-off position and said third control valve to the flow-through position and further controls the current commanded to each of said first to sixth linear differential pressure control valves so that the brake fluid passed through said third linear differential pressure control valve may be transmitted to said servo room for inducing the servo function.

39. A brake system for vehicles according to claim 34, 36 or 37, wherein said servo conduit is provided with a return valve to prevent the reverse flow from said servo room.

\* \* \* \* \*